April 2, 1963 R. W. WILSON 3,083,517
TOBACCO HARVESTER
Filed Sept. 22, 1961 16 Sheets-Sheet 1

INVENTOR
ROBERT W. WILSON
BY Cushman, Darby & Cushman
ATTORNEYS

April 2, 1963

R. W. WILSON 3,083,517

TOBACCO HARVESTER

Filed Sept. 22, 1961

INVENTOR

ROBERT W. WILSON

BY Cushman, Darby & Cushman

ATTORNEYS

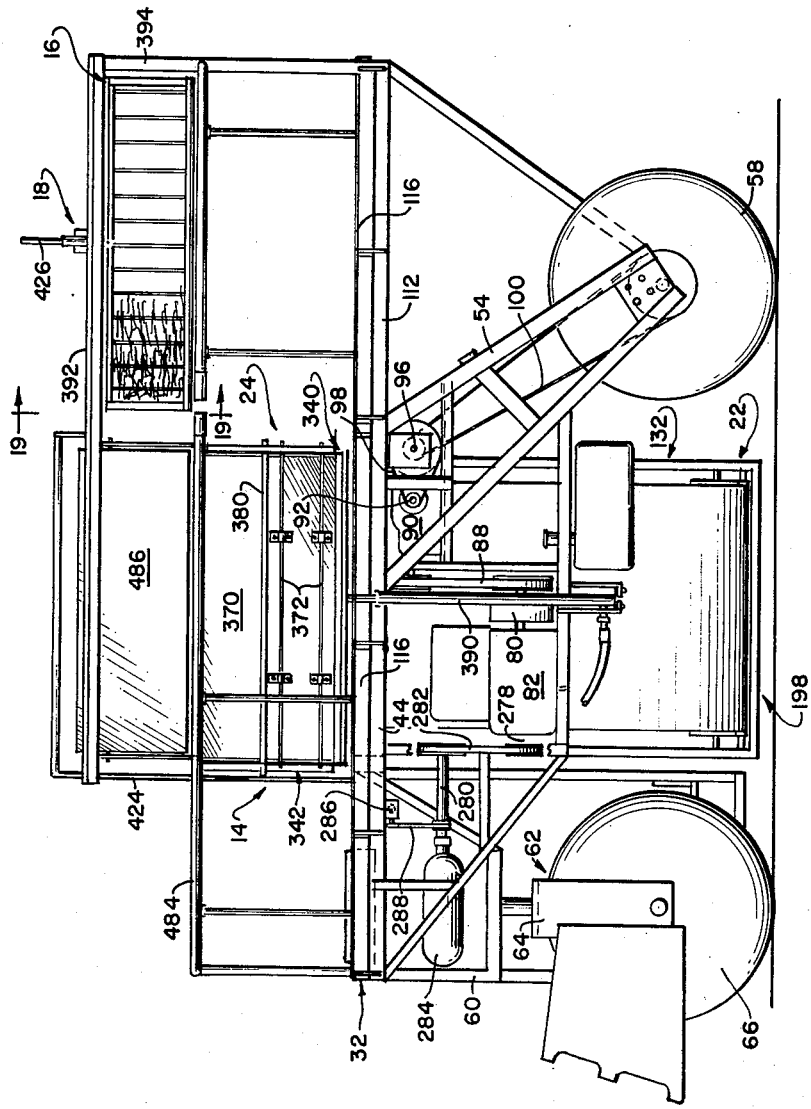

April 2, 1963

R. W. WILSON 3,083,517

TOBACCO HARVESTER

Filed Sept. 22, 1961

INVENTOR
ROBERT W. WILSON

BY Cushman, Darby & Cushman
ATTORNEYS

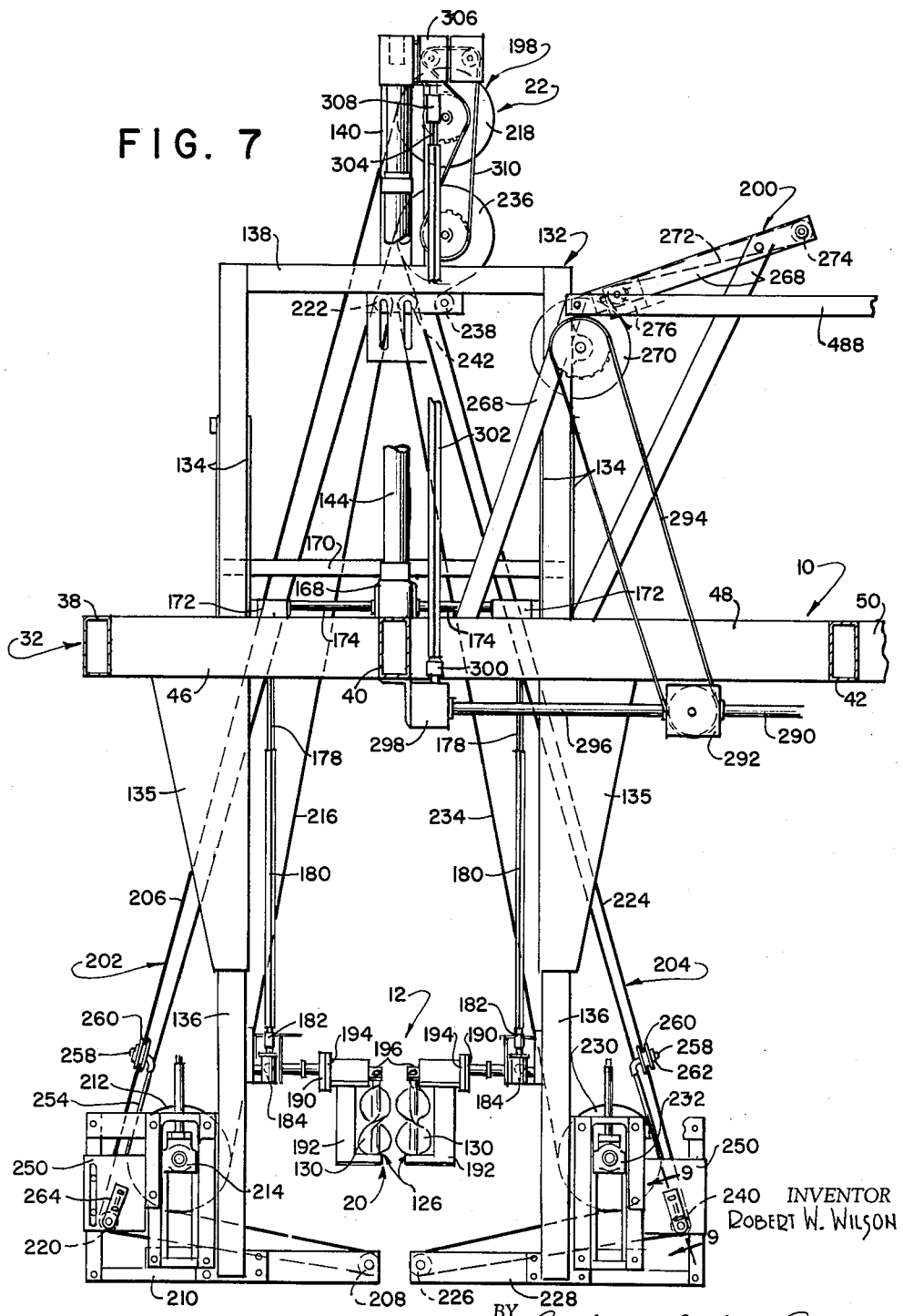

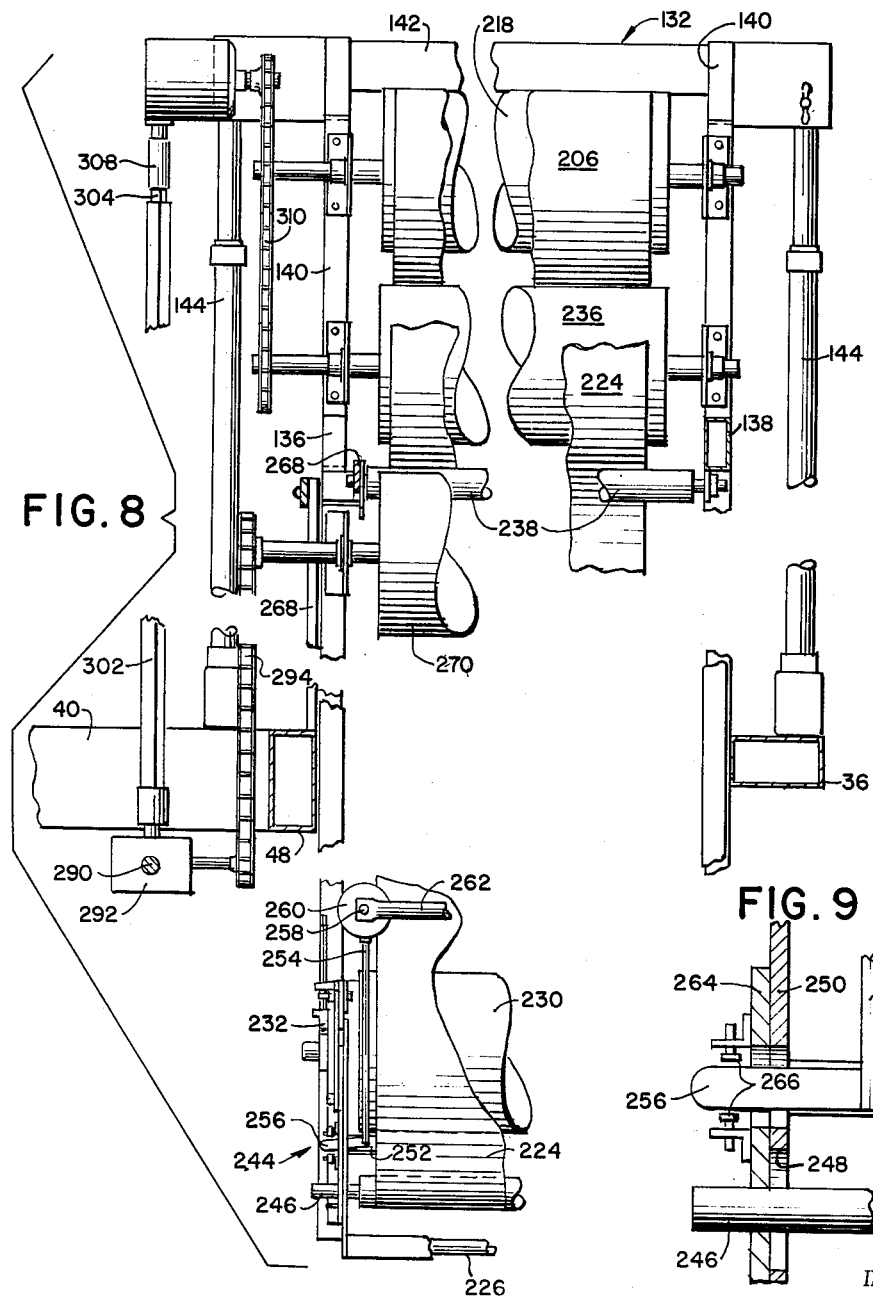
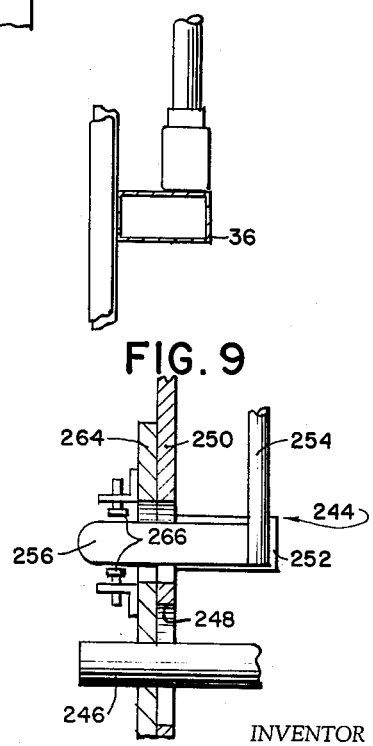

April 2, 1963  R. W. WILSON  3,083,517
TOBACCO HARVESTER

Filed Sept. 22, 1961  16 Sheets-Sheet 7

INVENTOR
ROBERT W. WILSON

BY Cushman, Darby & Cushman
ATTORNEYS

April 2, 1963   R. W. WILSON   3,083,517
TOBACCO HARVESTER
Filed Sept. 22, 1961   16 Sheets-Sheet 8
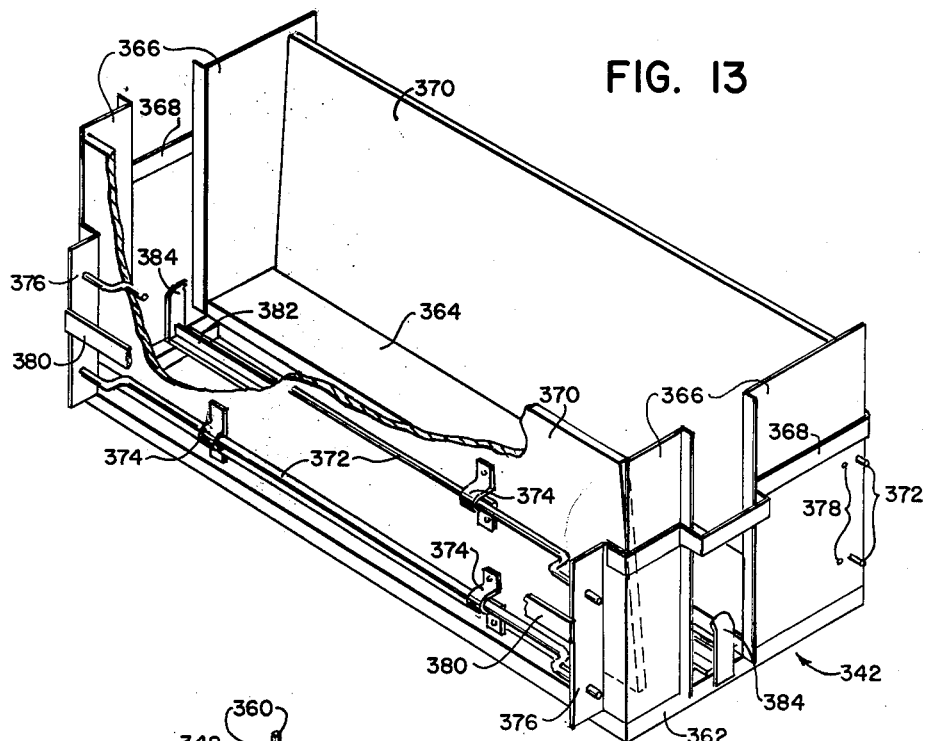
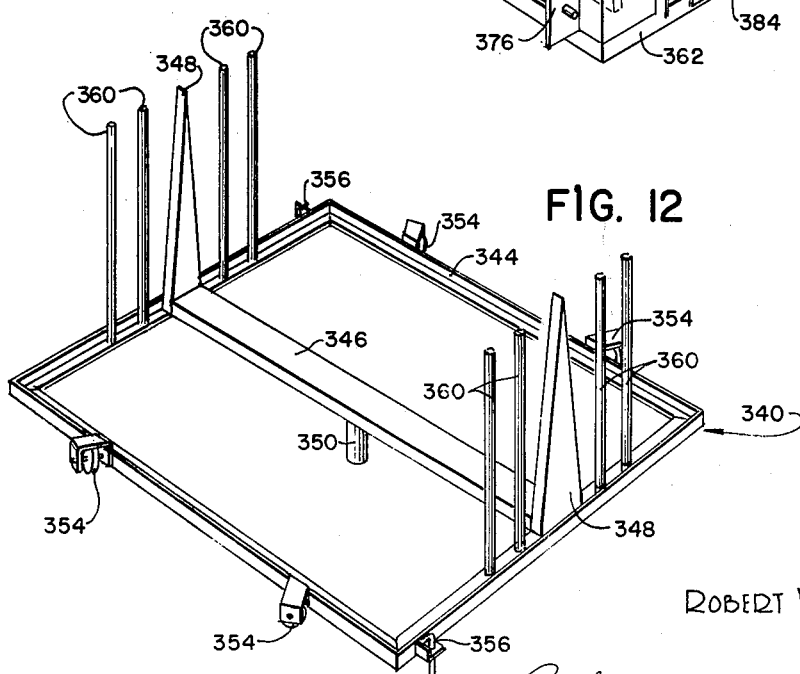
INVENTOR
ROBERT W. WILSON
BY Cushman, Darby & Cushman
ATTORNEYS

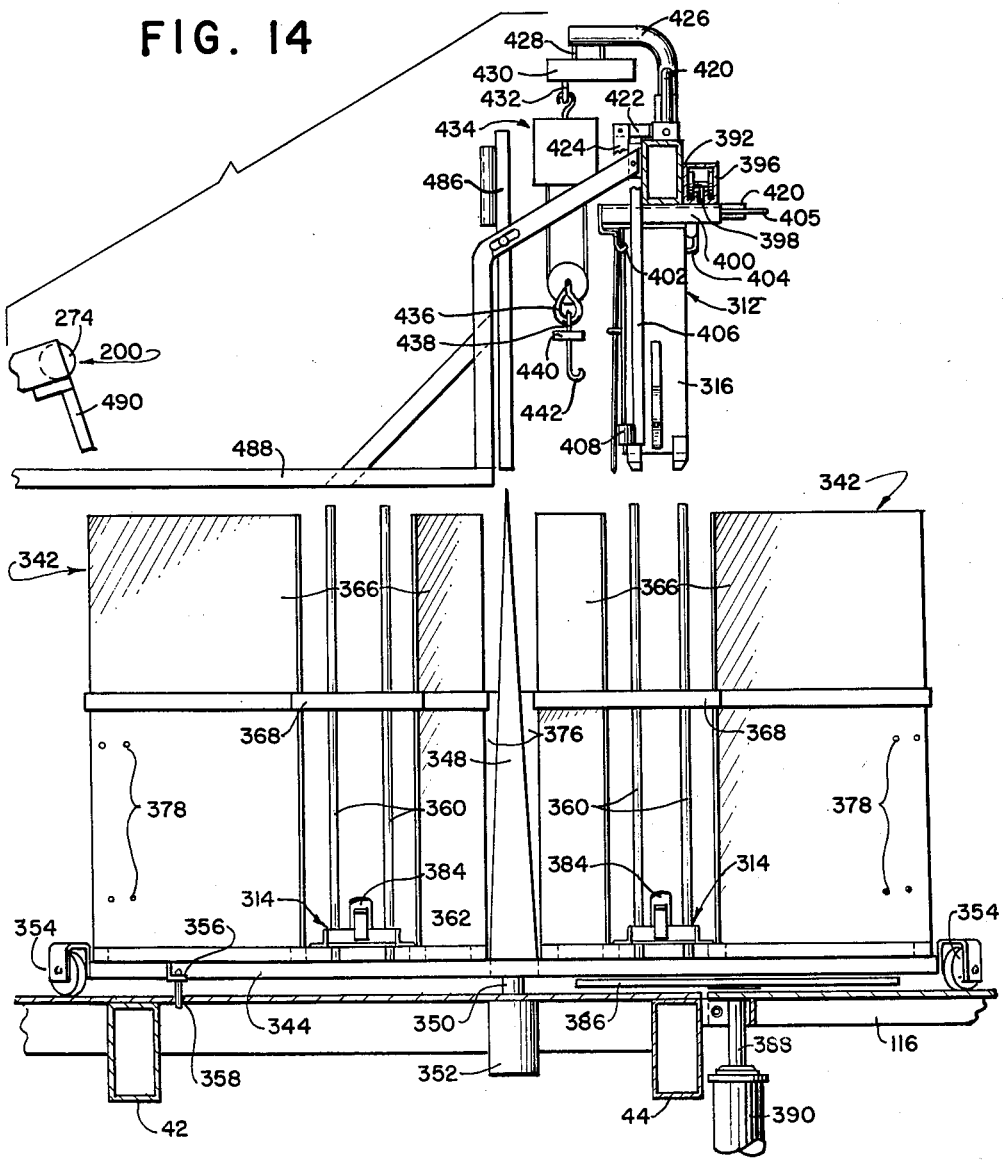

April 2, 1963

R. W. WILSON 3,083,517

TOBACCO HARVESTER

Filed Sept. 22, 1961

INVENTOR
ROBERT W. WILSON

BY Cushman, Darby & Cushman

ATTORNEYS

April 2, 1963

R. W. WILSON 3,083,517

TOBACCO HARVESTER

Filed Sept. 22, 1961

INVENTOR
ROBERT W. WILSON

BY Cushman, Darby & Cushman

ATTORNEYS

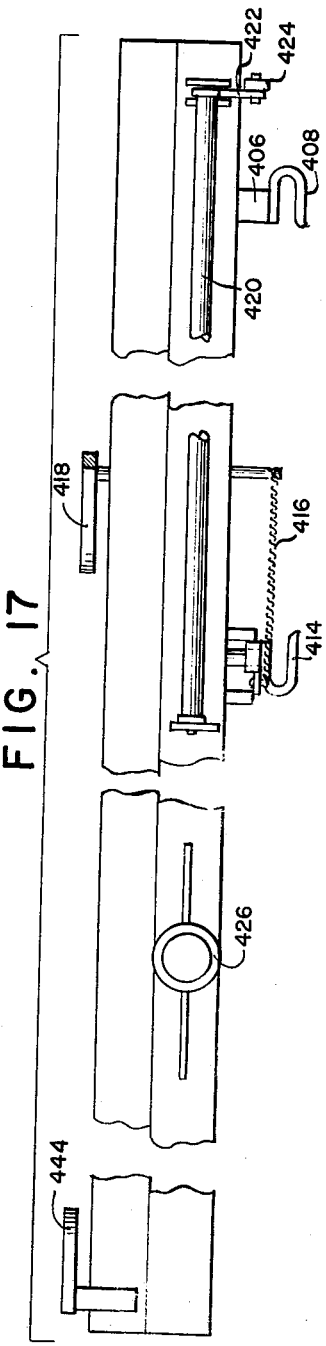

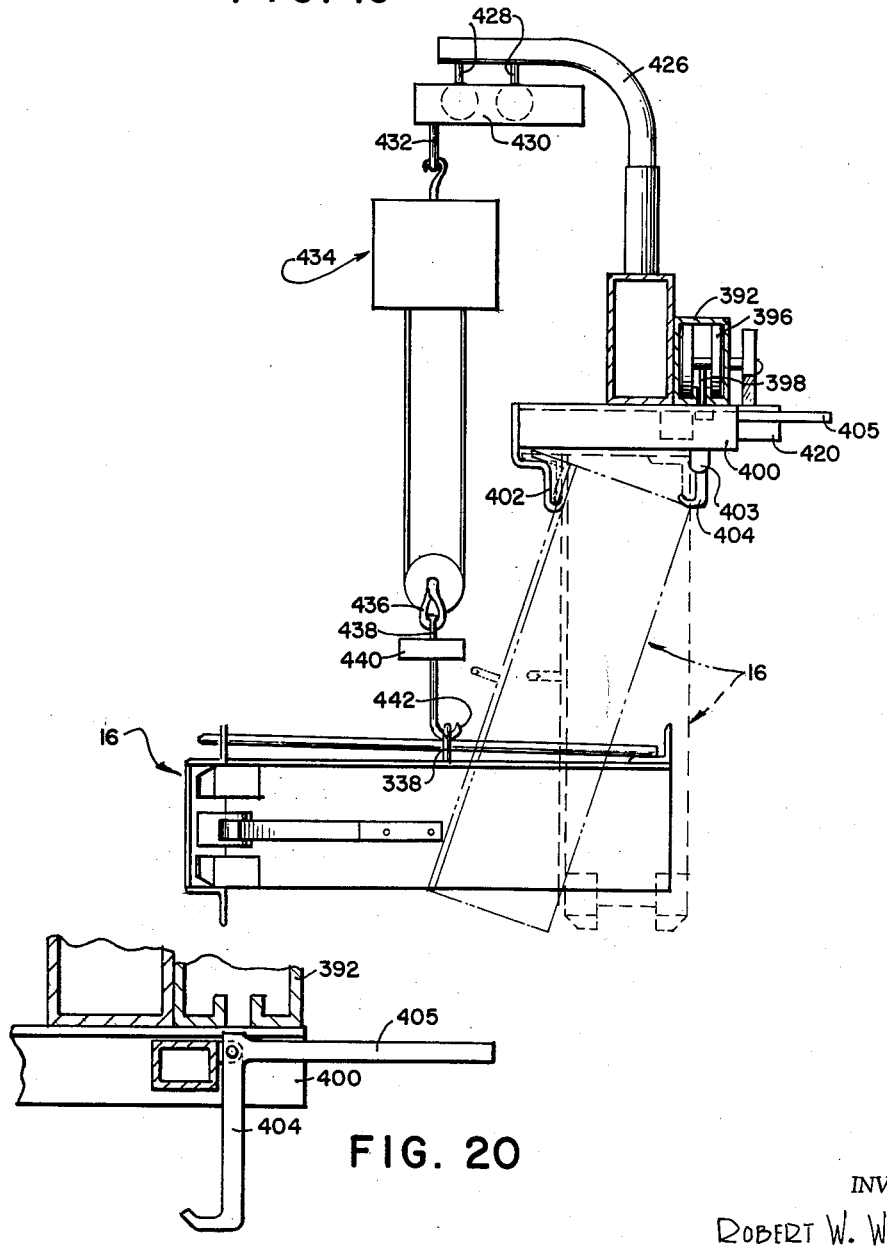

April 2, 1963  R. W. WILSON  3,083,517
TOBACCO HARVESTER
Filed Sept. 22, 1961  16 Sheets-Sheet 15
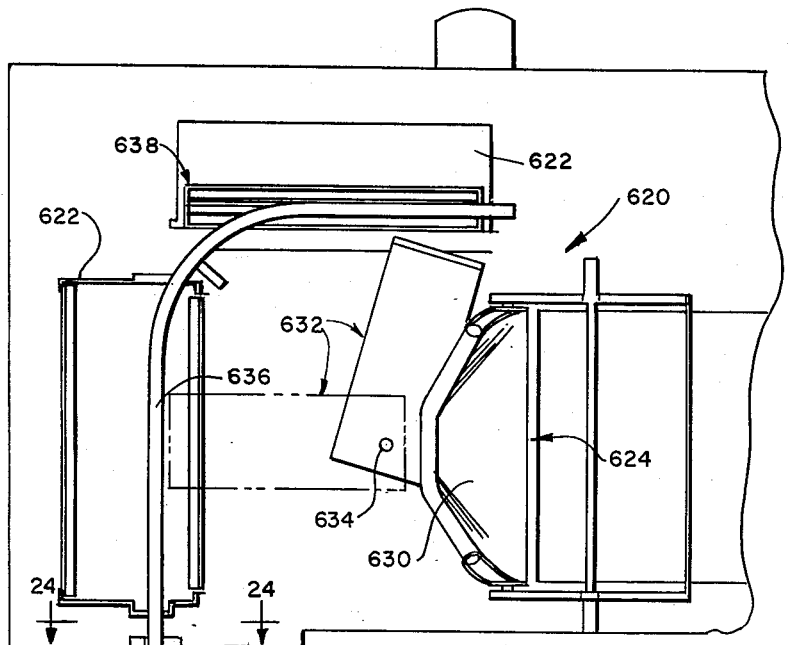
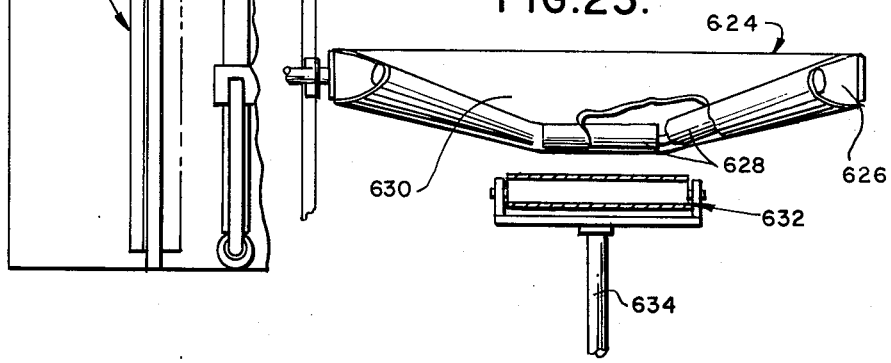
INVENTOR
ROBERT W. WILSON
BY Cushman, Darby & Cushman
ATTORNEYS April 2, 1963 R. W. WILSON 3,083,517
TOBACCO HARVESTER
Filed Sept. 22, 1961 16 Sheets-Sheet 16
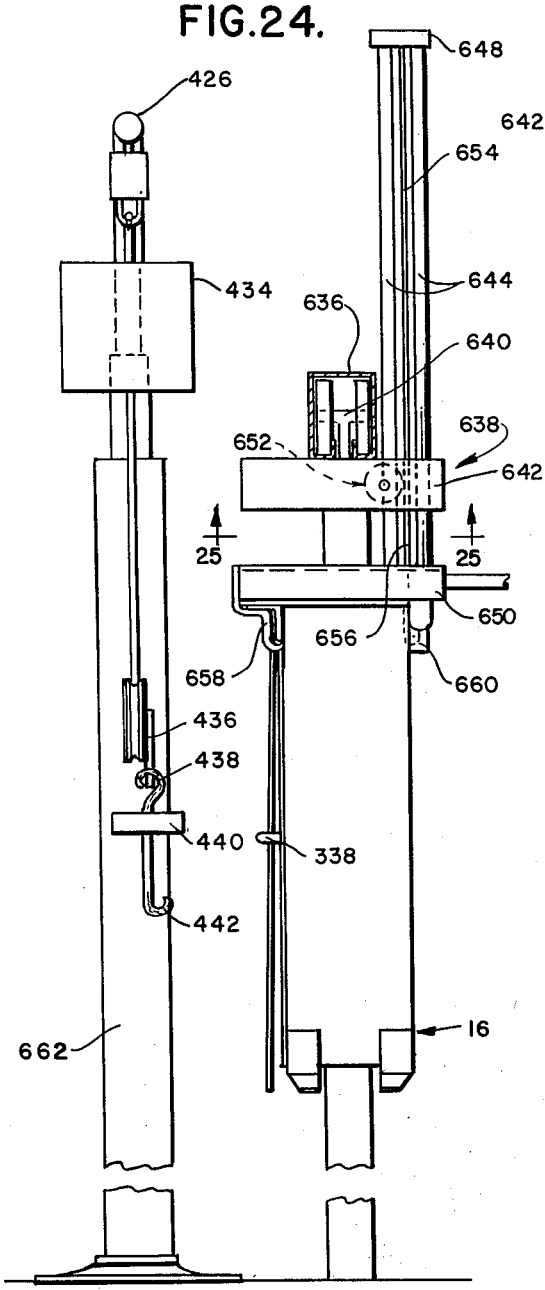
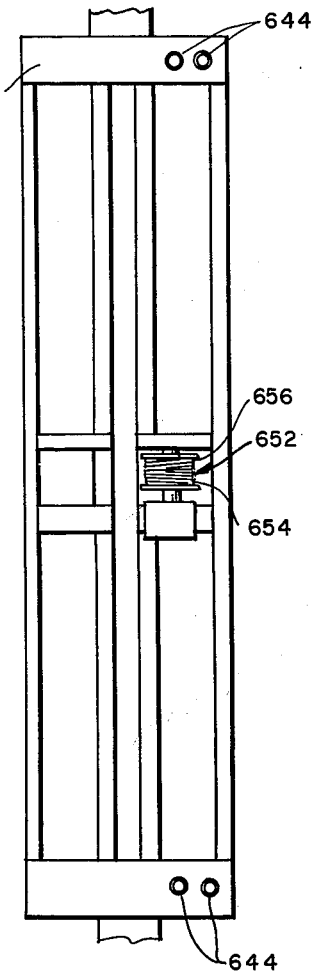
INVENTOR
ROBERT. W. WILSON
BY Cushman, Darby & Cushman
ATTORNEYS

United States Patent Office 3,083,517
Patented Apr. 2, 1963

3,083,517
TOBACCO HARVESTER
Robert W. Wilson, Charlotte, N.C., assignor to R. H. Bouligny, Inc., Charlotte, N.C., a corporation of North Carolina
Filed Sept. 22, 1961, Ser. No. 140,026
33 Claims. (Cl. 56—27.5)

This invention relates to the harvesting and curing of tobacco leaves and more particularly to improved apparatus for harvesting and curing tobacco leaves.

At the present time, tobacco of the bright leaf or flue cured type is handled to a large extent manually during the harvesting and curing operations. Bright leaf tobacco must be harvested at a particular time in the growing season and the leaves of the plant ripen at different times, the leaves progressively ripening from the bottom to the top on the stalk. The conventional practice is for "primers" to proceed through the field three or four times, and in each succeeding pass through the field the lowermost ripened leaves of the plants are removed by hand by the primer.

There have been proposals for replacing the conventional manual harvesting procedure with mechanisms capable of removing the ripe leaves from the plants by a mechanical action. Examples of mechanisms utilized for this purpose are found in Wilson Patents 2,816,411 and 2,834,173 and Wilson et al. Patent 2,834,174.

At present, mechanized harvesting of tobacco leaves has not been commercially adopted largely for the reason that no satisfactory system of mechanically handling the leaves thus harvested had been available. Conventionally, the primed leaves are handled manually by first placing them in bunches with their stems commonly aligned and tying these bunches, called "hands," by string or other instrumentality on elongated tobacco sticks. These sticks were then raised into supporting relation within a tobacco barn for curing in the conventional manner.

In recent years there has been proposed a system of handling tobacco leaves in substantial bulk form by the use of pronged racks. A rack of this type is capable of handling approximately 130 pounds of leaves or the same quantity of leaves that were previously handled on approximately 8 to 13 tobacco sticks.

In conjunction with the use of these bulk handling racks curing of the leaves must be carried out in the presence of a forced circulation of heat and air, due to the great quantity of leaves per unit of volume within the barn.

The development of this system of handling and curing tobacco leaves in bulk form makes it commercially feasible for the first time to provide a true tobacco leaf harvesting mechanism capable not only of removing the leaves from the plants but of subsequently handling the mechanically harvested leaves so that they are in a condition to be moved directly into the curing barn without the necessity of further manual handling. The present application contemplates a true tobacco harvesting machine which might be more accurately termed a "combine," which is capable during movement through a tobacco field of mechanically removing the ripened leaves from the tobacco plants, conveying the removed leaves to a baling station where they are loaded in bulk form into and secured within bulk curing racks, and of handling a plurality of the filled racks so that they are retained in a position to be bodily moved into an existing curing barn and/or can be utilized to form a part of such barn.

An overall study of the entire operation of a tobacco farmer in getting his tobacco to the market place has shown that over a period of less than approximately 20 years, the man hours required to accomplish the overall operation including producing the plants, preparing land, transplanting, cultivating, controlling suckers and topping, harvesting and barning, curing, and marketing, has increased from approximately 408 man hours to approximately 426 man hours. The greatest increase in any one of the above-mentioned operations occurs in the harvesting and barning operation. The above figures are based upon the average man hours required to produce an acre of flue cured tobacco and the increase in man hours required in the harvesting and barning operation can be attributed primarily to the substantial increase in the amount of tobacco leaves that can be produced in an acre as compared with approximately 20 years ago. Indeed the man hours required in many of the operations have been reduced, particularly those dealing with the preparation of the land, cultivating and curing.

It is evident that with the increased costs of labor and the increased difficulties in obtaining the necessary labor at the critical times when it is required, indicate that a commercial apparatus capable of substantially reducing the man hours required in the harvesting and barning operation constitutes an acute need to tobacco farmers, a need which has existed for a considerable period of time. Indeed, conventional practices seem to indicate a resistance on the part of tobacco farmers to adopt mechanized procedures in those operations which have been commercially mechanized because of the preference to provide work for those laborers which are required during the harvesting season.

Accordingly, an object of the present invention is to fill the acute need of the tobacco farmer by the provision of apparatus capable of substantially reducing the man hours required to harvest and barn flue cured tobacco.

Another object of the present invention is the provision of a device which is capable of being dis-associated from the central heating and air circulating source and utilized in cooperation with the harvesting apparatus so as to greatly simplify the handling of the leaves in bulk form from the position of harvesting to the position of curing.

Still another object of the present invention is the provision of an apparatus of the type described having improved means for conveying the defoliated leaves from the defoliation station to a collection station.

Still another object of the present invention is the provision of an apparatus of the type described having a rack loading and securing mechanism capable of collecting leaves from a conveyor mechanism in cooperating relation with a rack section and of subsequently effecting relative movement of a cooperating rack section into engagement with the first-mentioned rack section and into supporting engagement with the leaves collected therewith.

Still another object of the present invention is the provision of a rack loading and securing mechanism which is capable of simultaneously effecting the collection of leaves in cooperating relation with one rack section and the securement of cooperating rack sections together in supporting relation to a batch of leaves collected therewith.

Still another object of the present invention is the provision of an apparatus of the type described having a rack loading and securing mechanism and a cooperating rack handling mechanism which is capable of handling successive filled and secured-together racks without the necessity of manual lifting thereof.

Still another object of the present invention is the provision of a rack loading and securing mechanism embodying movable rack section receiving and tobacco leaf guide units and means for moving a plurality of such units between a loading position wherein a batch of leaves are collected therein in cooperating relation to the rack section received thereby and a spaced baling or rack securing position wherein a cooperative rack section is moved into engagement with the rack section received by the unit and in supporting relation to the tobacco collected therewith.

Still another object of the present invention is the provision of a rack loading and securing mechanism including a plurality of fixed rack section receiving and tobacco leaf guide units and means for effecting the loading of leaves in either of the fixed units and of subsequently securing a cooperating rack section with the rack section received therein and in supporting relation to the tobacco leaves associated therewith.

Still another object of the present invention is the provision of a rack handling mechanism including an elevating mechanism for receiving and lowering a rack support capable of receiving and supporting a plurality of loaded racks.

These and other objects of the present invention will become more apparent during the course of the following detailed description and appended claims.

The invention may best be understood with reference to the accompanying drawings wherein an illustrative embodiment is shown.

In the drawings:

FIGURE 3 is an elevational view of the apparatus shown in FIGURE 1 looking at the left side thereof;

FIGURE 7 is an enlarged sectional view taken along the line 7—7 of FIGURE 1 showing the conveying mechanism;

FIGURE 8 is an enlarged sectional view taken along the line 8—8 of FIGURE 1 showing the conveying mechanism;

FIGURE 9 is an enlarged fragmentary sectional view taken along the line 9—9 of FIGURE 7;

FIGURE 12 is a perspective view of the turntable of the rack loading and securing mechanism;

FIGURE 13 is an enlarged perspective view, with parts broken away, of the tobacco leaf guide unit of the rack loading and securing mechanism;

FIGURE 14 is an enlarged sectional view taken along the line 14—14 of FIGURE 1 showing the rack loading and securing mechanism in a position prior to the securement of the rack sections together;

FIGURE 17 is an enlarged fragmentary top plan view of the beam;

FIGURE 18 is an elevational view of the beam;

FIGURE 19 is an enlarged sectional view taken along the line 19—19 of FIGURE 3 showing the rack handling mechanism in three successive rack handling positions illustrated in dotted phantom and full lines respectively;

FIGURE 20 is an enlarged fragmentary sectional view taken along the line 20—20 of FIGURE 16;

FIGURE 22 is a fragmentary top plan view showing a rack loading and securing mechanism of modified form;

FIGURE 23 is an enlarged fragmentary sectional view of the modified conveyor section;

FIGURE 24 is an enlarged sectional view taken along the line 24—24 of FIGURE 22; and FIGURE 25 is a cross-sectional view taken along the line 25—25 of FIGURE 24.

Figures 1, 4:
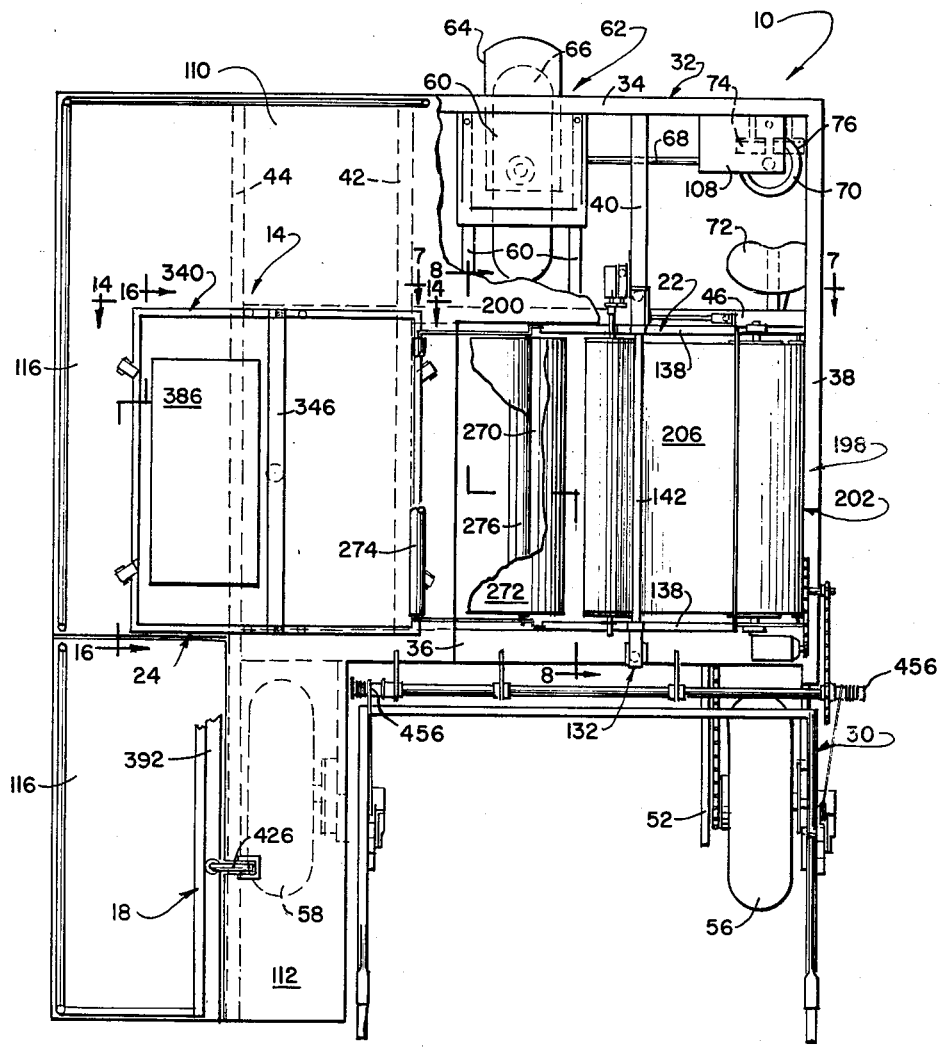
FIGURE 1 is a top plan view of an apparatus embodying the principles of the present invention with certain parts omitted for the purpose of clearer illustration.
FIGURE 4 is an enlarged fragmentary sectional view taken along the line 4—4 of FIGURE 1.

Referring now more particularly to the drawings, there is shown in FIGURES 1 through 8 thereof an apparatus for mechanically defoliating tobacco leaves and mechanically handling the defoliated leaves in bulk form. In general, the apparatus comprises a vehicle frame 10 which, as shown, is preferably of the self-propelled type capable of movement through a field of mature tobacco. The vehicle frame 10 provides a lower defoliating station 12 at which the leaves of the plants are removed during the movement of the vehicle frame through the field, an upper forwardly positioned leaf baling station 14 at which the removed leaves are secured within suitable bulk curing racks 16, and an upper rearwardly positioned rack handling station 18 at which the loaded racks are handled for purposes of storage and facilitation of their subsequent transportation to a remote curing station for curing of the tobacco supported therein.

The preferred apparatus as shown includes a defoliating mechanism 20 carried by the vehicle frame at the defoliating station thereof for vertical movement with respect to the vehicle frame into different positions of vertical adjustment depending upon the position of the leaves to be defoliated on the tobacco stalks within the field. Mounted for vertical movement with the defoliating mechanism is one section of a conveyor mechanism 22 which is capable of moving the leaves removed by the defoliating mechanism 20 from the defoliating station to the baling station.

At the baling station on the vehicle frame the tobacco leaves conveyed to the baling station by a second section of the conveying mechanism 22 are loaded and secured within successive racks 16. For this purpose, there is provided at the baling station a rack loading and securing mechanism generally indicated by the numeral 24.

In the preferred apparatus shown, a rack handling mechanism 26 is positioned on the vehicle frame at the rack handling station thereof for effecting movement of the racks loaded by the rack loading and securing mechanism 24 away from the latter into a rack supporting device 28 which is preferably constructed so as to receive and support a plurality of loaded racks so that the loaded racks supported therein can be conveniently transported from the vehicle frame to the curing station. The present apparatus also provides an elevating mechanism 30 for handling successive rack supporting devices 28 to facilitate their transportation to the curing station.

Vehicle Frame

Figure 2:
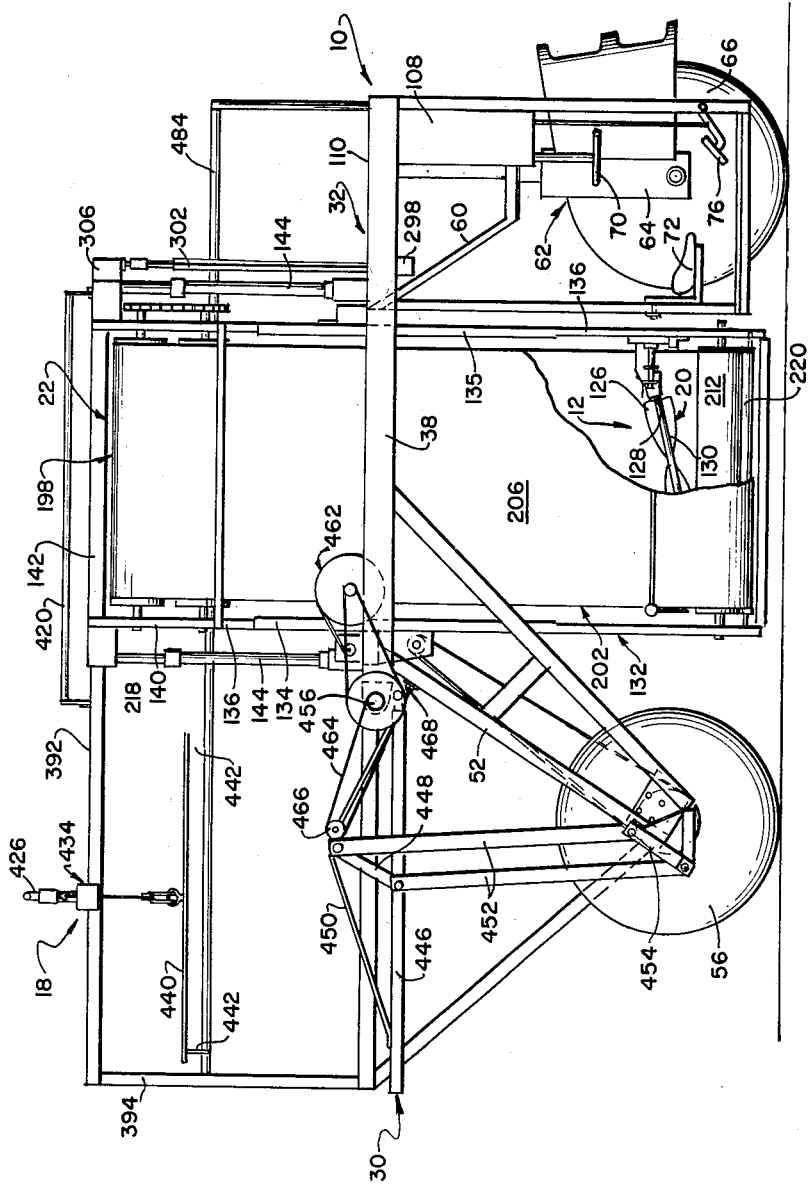
FIGURE 2 is an elevational view of the apparatus shown in FIGURE 1 looking at the right side thereof, with certain parts broken away for purposes of clearer illustration.

As best shown in FIGURES 1–3, the vehicle frame 10 includes a horizontal skeletonized platform section 32 which is preferably constructed of a pair of forward and rearward transverse frame members 34 and 36 rigidly interconnected by a plurality of transversely spaced longitudinally extending frame members 38, 40, 42 and 44, welded or otherwise fixedly secured to the transverse frame members. The central portions of the longitudinal frame members are suitably braced as by transversely extending intermediate frame members 46, 48 and 50, extending therebetween adjacent the central portion thereof.

The horizontal platform section 32 is supported in an elevated position above the ground at a height sufficient to clear mature tobacco plants by a pair of rearwardly and downwardly extending skeletonized frame sections 52 and 54, the latter having driven ground engaging wheels 56 and 58 respectively rotatably mounted on their lower portions. A downwardly extending skeletonized frame section 60 is suitably fixedly secured between the central portion of the forward transverse frame member 34 and the central intermediate transverse frame member 48 and has mounted on the lower portion thereof a steerable wheel assembly 62.

The steerable wheel assembly 62 includes a forked yoke 64, the upper end of which is journaled in the frame section 60 for pivotal movement about an upright axis and the lower end of which has rotatably mounted thereon a steerable ground engaging wheel 66. Connected with the upper part of the yoke is a motion transmitting mechanism 68 of any conventional construction which is capable of effecting steering movements of the steerable wheel assembly 62 in response to movements of a steering wheel 70 carried by the frame at a position below the intersection of the forward transverse frame member 34 and the longitudinal frame member 42.

Figure 5:
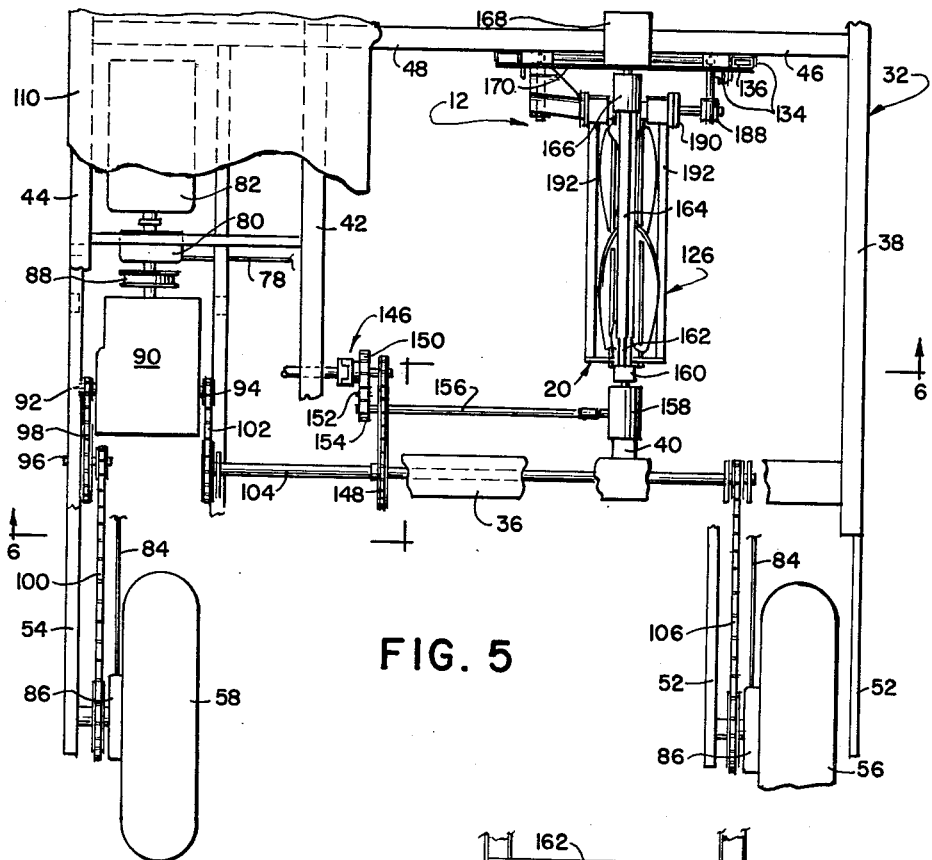
FIGURE 5 is a fragmentary top plan view with parts broken away to more clearly show the manner in which the rear wheels of the vehicle and the defoliating units are driven.

As best shown in FIGURES 1 and 2, an operator's seat 72 is mounted in a convenient position rearwardly of the steering wheel 70 so that an operator seated on the seat 72 may conveniently effect movements of the steering wheel 70 as are required and to effect movement of clutch and brake pedals 74 and 76 by foot operation in the conventional manner. The clutch pedal 74 is connected through a suitable cable and pulley assembly 78 to a clutch mechanism 80 connected with the output shaft of an internal combustion engine 82 carried by the frame at a position beneath the central portion of the longitudinal frame members 38 and 40, as best shown in FIGURE 5. The brake pedal 76 is connected through suitable cable and pulley assembly 84 to conventional brake assemblies 86 mounted on the rear driving wheels 56 and 58.

Figure 6:
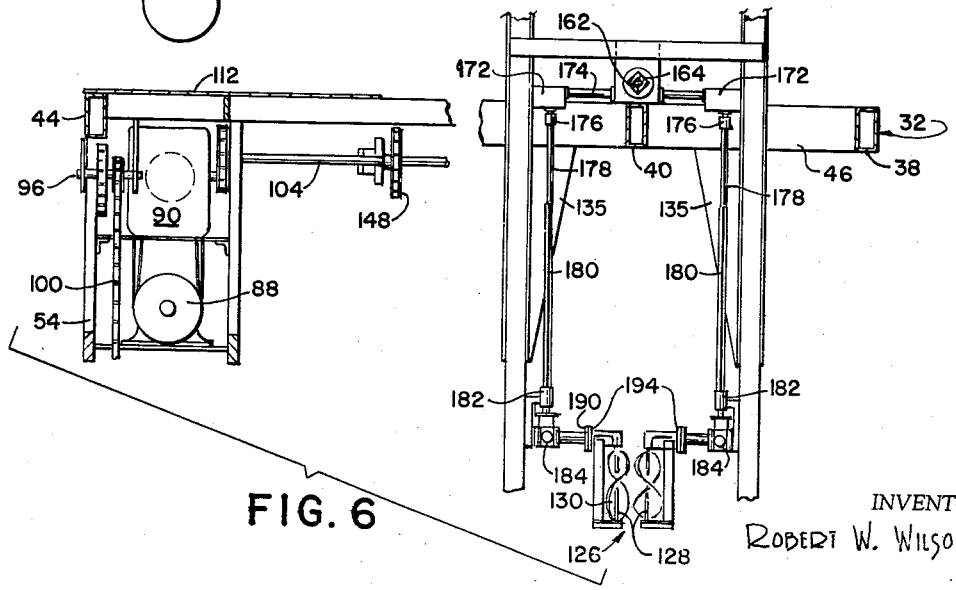
FIGURE 6 is a sectional view taken along the line 6—6 of FIGURE 5 showing the manner in which the defoliating units are mounted and driven.

As best shown in FIGURES 5 and 6, the output shaft of the clutch mechanism 80 has one pulley of a variable speed belt and pulley assembly 88 mounted thereon, the other pulley of which is mounted on the input shaft of a gear transmission unit 90 suitably mounted on the vehicle frame 10. The gear unit 90 includes a pair of opposed transversely extending output shafts 92 and 94, the shaft 92 being drivingly connected with an intermediate stub shaft 96 suitably journaled on the frame, by any suitable means such as a sprocket and chain assembly 98. The shaft 96, is in turn, drivingly connected with the rear wheel 58 by any suitable means, such as a sprocket and chain assembly 100.

The output shaft 94 of the gear unit 90 is drivingly connected, as by a sprocket and chain assembly 102, to one end of an elongated shaft 104 suitably journaled on the rear transverse frame member 36. Another sprocket and chain assembly 106 serves to drivingly connect the opposite end of the shaft 104 with the rear wheel 56.

It can thus be seen that the rear wheels 56 and 58 are driven by the engine 82 under the control of the clutch mechanism 80 by the operator on the driver's seat 72. The forward speed of the vehicle frame is also under the control of the operator through suitable remote control actuation (not shown) of the variable belt and pulley assembly 88 from a control box 108 suitably mounted above the steering wheel 70.

It will be noted that the vehicle frame 10 as described above is of sufficient size to straddle two rows of tobacco plants, one row extending between the rear wheel 56 and the front steerable wheel 66 and the other row extending between the steerable wheel 66 and the opposite rear wheel 58. The defoliating station 12 is disposed in a position to engage this former row of tobacco plants at a position just rearwardly of the operator's seat 72.

The leaf baling station 14 and rack handling station 18 are located at a position above the horizontal platform structure 32 of the vehicle frame and, to this end, the forward and left side portions of the horizontal platform structure are provided with a floor 110 which may be of sheet metal, expanded metal or any other suitable construction.

Extending rearwardly from the left hand portion of the horizontal platform structure 32 and rigidly secured thereto is a platform extension 112 which is made up of a skeletonized frame section covered by a floor of sheet metal construction or the like. In addition to the above, the longitudinal frame member 44 and aligned side of the platform extension 112 have formed thereon pivot brackets 114 to which are connected swingable platform sections 116 and as by pivot pins 118 extending through the brackets 114 and cooperating brackets 120 on the platform sections, as shown in FIGURE 4. The swingable platform sections, which are constructed of skeletonized frames covered by metal sheets, are so arranged that when they are moved into a horizontal position they will be retained therein by stop abutments 122. The stop abutments 122 are fixed to the platform sections and extend downwardly therefrom for engagement with the frame member 44 when the platform sections are positioned horizontally, as shown in FIGURE 4. Preferably removable railings 122 are mounted adjacent the outer sides of the platform sections and the latter may be moved into a vertical position by pivotal movement about their pins 118 so as to provide adequate clearance for the vehicle frame such as when on the highway or the like.

The baling station 14 of the vehicle frame is provided on the floor at the horizontal platform level and is specifically disposed at the position adjacent the forward left portion thereof including the forward portion of the forward swingable platform section 116. The rear left portion of the floor, the rearward platform extension 112 and the rearward swingable platform section 116 define the rack handling section 18.

Defoliating Mechanism

The construction of the defoliating mechanism 20 is preferably of the type disclosed in Wilson Patent No. 2,816,411, Wilson Patent No. 2,834,173, and Wilson and Suggs Patent No. 2,834,174, all of which are hereby incorporated by reference herein. The various mechanisms disclosed in the above patents may be readily interchanged and utilized to best advantage where the conditions are best suited. For exemplary purposes there has been shown in FIGURES 5 and 6 a wiper-type defoliating mechanism 20 similar to that disclosed in Wilson and Suggs Patent No. 2,834,174. In general, the defoliating mechanism 20 includes two units 126 which are mounted in horizontally spaced side-by-side relationship. Each of the units comprises a shaft 128 on which is mounted a rotary wiper element preferably made of rubber or the like, which includes two helical wiper blades 130 disposed 180° out of phase with respect to each other.

The defoliating units 126 are mounted for vertical adjustment on a vertically movable frame section generally indicated at 132. The frame section 132 is mounted on the vehicle frame for vertical movement by forward and rearward pairs of transversely spaced vertically extending upper parallel guide plates 134 and corresponding lower plates 135, each corresponding pair of which slidably receives a vertical frame member 136 forming a part of the frame section 132. Each pair of vertical frame members 136 is rigidly interconnected at their upper ends by a transversely extending horizontal frame member 138 having a vertical frame member 140 extending upwardly from the central portion thereof. The upper ends of the members 140 are rigidly interconnected by an overhanging longitudinally extending horizontal beam member 142. The entire frame 132 is raised and lowered by any suitable means, such as a pair of single acting hydraulic ram units 144, having their lower ends connected to the platform and their upper ends connected to the overhanging ends of the beam member 142.

Each of the defoliating units is rotatably driven in response to the rotation of the rear wheels 56 and 58 and hence in timed relation to the forward travel of the vehicle frame. To this end, there is mounted on the forward central portion of the rear transverse vehicle frame member 36 a clutch assembly 146 which is drivingly connected to the elongated shaft 104, as by a sprocket and chain assembly 148. It will be understood that any suitable remote control means (not shown) may be extended from the clutch assembly 146 to the control box 108 adjacent the steering wheel 70 so that the operator can control the drive to the defoliating units at his seat.

As best shown in FIGURES 5 and 6, the clutch assembly 146 includes an output sprocket wheel 150 having a chain 152 trained thereabout and about a second sprocket wheel 154 secured to one end of a transversely extending shaft 156 journaled on the rear transverse frame member in parallel relation to the shaft 104. The opposite end of the shaft 154 is connected to the input shaft of a right angle gear box assembly 158, the output shaft of which is connected, through a universal joint 160, to one end of a square shaft 162. The opposite end portion of the square shaft 162 extends telescopically within one end portion of a hollow tubular square shaft 164, the opposite end of which is connected through a universal joint 166 to the input shaft of a gear box assembly 168 suitably mounted on a cross brace 170 extending between the forward pair of vertical frame members 136 of the frame section 132. The gear box assembly 168 includes opposed output shafts extending transversely outwardly therefrom each of which is connected with the input shaft of a right angle gear box assembly 172, as by shaft sections 174. Each gear assembly 172 has a vertically downwardly extending output shaft which is connected, as by a universal joint 176, to one end of a square shaft 178, the opposite end portion of which is telescopically mounted within one end portion of a hollow tubular square shaft 180. The opposite end of each tubular square shaft 180 is connected, as by a universal joint 182, to the input shaft of a right angle gear assembly 184 mounted on a rigid bracket assembly 186 fixedly mounted on the associated vertical member 136 in any one of a plurality of vertically adjusted positions. The output shaft of each gear assembly 184 extends rearwardly and is connected with the input shaft of still another right angle gear assembly 188 mounted on the associated bracket assembly. The output shaft of each gear assembly 188 is splined and extends transversely inwardly through an annular flange 190 fixed to the associated bracket assembly 186.

Each defoliating unit 126 also includes an elongated U-shaped frame 192, the legs of which rotatably support the ends of the associated wiper element shaft 128. Fixed to the end of the forward leg of the U-shaped frame is an annular flange 194. Each pair of associated annular flanges 190 and 194 are provided with a plurality of circumferentially spaced bolt receiving apertures thus permitting the defoliating units to be mounted in cantilevered fashion in any position of angular inclination with respect to the horizontal plane. In this regard it will be noted that a wiper type defoliating unit 126 such as shown in the drawings should impart a downward wiping action to the leaves in order to effect the removal thereof from the plants. Thus, the wiper type defoliating units should extend downwardly and rearwardly from the connection at the annular flanges. Suffice it to say that for present purposes, the cooperating annular flange type connection enables the defoliating units, regardless of the type employed, to be mounted in the most advantageously disposed position.

It will be noted that the splined output shaft of each gear assembly 188 extends through the associated annular flange 194 of the defoliating unit, and is drivingly connected to the forward end of the associated wiper element shaft 128 by a special gear box assembly 196 mounted on the adjacent leg of the associated U-shaped frame 192.

In this way, the wiper element blades 130 are rotated in response to the forward travel of the vehicle frame under the control of the clutch assembly 146.

*Conveying Mechanism*

The conveying mechanism 22 includes a vertical section 198 and a horizontal section 200 the former being mounted on the vertically movable frame section 132 for vertical movement with the defoliating units 126. As best shown in FIGURES 7 and 8, the vertical conveyor section 198 includes two belt conveyor units 202 and 204 each of which cooperates with one of the defoliating units 126 at its lower portion and cooperates with the other belt conveyor unit at its upper portion to deposit leaves removed by the defoliating units on the horizontal conveyor section 200.

The belt conveyor unit 202 includes an outer belt 206 which is trained about a roller 208 mounted between the inner ends of a conveyor pan structure 210 fixedly mounted between the lower ends of the laterally outer vertical frame members 136 of the frame section 132. As is clearly illustrated in FIGURE 7, the roller 208 is disposed in a position below the cooperating defoliating unit 126 and the outer belt 206 is trained thereabout to receive the leaves removed by the associated defoliating unit. The leaves are carried laterally outwardly under a large roller 212 which is mounted on the conveyor pan structure 210, as by vertically adjustable bearing assemblies 214.

The large roller 212 also has trained thereabout an inner belt 216 so that the leaves collected from the defoliating unit by the outer belt and conveyed laterally outwardly will be confined between the outer and inner belts as they pass under the large roller 212 and carried thereby upwardly to a cooperating upper roller 218 around which the outer belt 206 is trained. In addition to the rollers 208, 212, and 218, the outer belt 206 is also trained about a lower roller 220 mounted between the outer ends of the conveyor pan structure 210. The inner belt 216 is also trained about an upper roller 222 which is disposed somewhat below the large upper roller 218.

The belt conveyor unit 204 likewise includes an outer belt 224 which is trained about an inwardly disposed longitudinally extending roller 226, mounted on a conveyor pan structure 228 disposed in horizontally spaced relation to the roller 206 and which is adapted to receive the leaves removed by the associated defoliating unit 126. As before, the outer belt 224 is adapted to convey the leaves transversely away from the row of tobacco plants and then under a large lower roller 230 supported on the pan structure 228, as by vertically adjustable bearing assemblies 232 and about which an inner belt 234 is trained. The removed leaves are similarly carried between the inner and outer belts upwardly from the roller 230 toward a large upper roller 236 about which the outer belt 224 is trained, the latter also being trained about small upper and lower rollers 238 and 240. As can be seen from FIGURE 7, the inner belt 234 is trained at its upper end about a small roller 242 and the upper large roller 236 is positioned in the path of movement of the outer belt 206 of the belt conveyor unit 202. Thus, all of the leaves carried upwardly by either of the belt conveyor units 202 and 204 are ultimately gripped between the two outer belts 206 and 224 of the units and conveyed transversely outwardly therebetween.

In utilizing belts of a width such as is required in the present instance it is desirable if not required to provide some mechanism for maintaining the alignment of the belts on the various rollers during operation. Any suitable belt aligning mechanism may be utilized for this purpose.

For the purposes of illustration one form of a mechanical belt aligning mechanism 244 will be described in connection with the roller 240, of the outer belt 224 it being understood that a similar mechanism 244 is utilized in conjunction with the roller 220 of the outer belt 206, the roller 222 of the inner belt 216, and the roller 242 of the inner belt 234. As best shown in FIGURES 7, 8 and 9, the roller 240 includes outwardly extending stub shafts 246 mounted within inclined elongated slots 248 formed in mounting plates 250 secured to the ends of the associated pan structure 228. Extending inwardly from each plate 250 in aligned spaced relation above the associated slot 248 is a rigid lug 252 having pivotally mounted thereon a bell crank including an elongated vertical arm 254 and a short horizontal arm 256. The upper end of each arm 254 has a rigid stub shaft 258 extending therefrom in a direction parallel to the pivotal axis of the arm upon which is journaled a roller 260 having its periphery grooved to receive the adjacent edge of the belt 224. The outer end of each shaft 258 pivotally receives one end of a connecting rod 262 which serves to effect simultaneous pivotal movement of both arms 254 and hence parallel movement of the rollers 260.

The horizontal arm 256 of each bell crank extends outwardly through an accommodating opening formed in the associated plate 250. The outwardly extending end of each roller stub shaft 246 is journaled within an opening formed in a plate 264, which plate has a spaced elongated slot through which the outer end of the associated arm 256 extends. The plate has mounted at opposite ends of the slots a pair of spaced adjustably opposed abutments 266 for engaging opposite side edges of the arm 254.

It can be seen that when the belt 224 moves to the left as shown in FIGURE 8, the left roller 260 will be moved to the left causing a counterclockwise pivotal movement of the associated bell crank as viewed in FIGURE 8 so that the arm 256 thereof moves downwardly thus effecting a downward movement of the associated roller stub shaft 246 within the associated slot 248 through the operation of the associated plate 264. At the same time, the righthand stub shaft will be moved upwardly so that the roller 220 is canted in a direction tending to cause the belt to move to the right as shown in FIGURE 8 to a centralized condition. It will be understood that the roller 220 is canted in the opposite direction when the belt moves to the right away from its centralized condition.

The horizontal conveyor section 200 is mounted on suitable struts 268 secured on the platform section 32 of the vehicle frame 10. As shown, the conveyor section 200 includes a main large roller 270 around which is trained a belt 272, which is also trained about an outer small roller 274 and an adjustable roller 276. It will be seen that the upper flight of the belt 272 will receive the leaves issuing from between the outer belts 206 and 224 between the two large upper rollers of the conveyor section 198. The leaves received on the upper flight of the belt 272 of the conveyor section 200 are discharged at the baling station 14 on the platform section 32 of the vehicle frame, where they are loaded into the racks 16 and finally secured in position.

Any suitable means may be provided for effecting a continuous movement of the conveyor mechanism 22. As shown more particularly in FIGURE 3 rotative power for this purpose is taken from an internally clutched power take-off shaft 278 of the internal combustion engine 82. The shaft 278 is drivingly connected to one end of an intermediate longitudinal shaft 280, as by a belt and pulley assembly 282. The opposite end of the shaft 280 is connected in driving relation to a hydraulic pump unit 284 which serves as a source of hydraulic pressure to actuate the various hydraulic instrumentalities utilized in the apparatus through suitable hose or tubing and suitable controls located conveniently in the control box 108 or at the baling station.

Mounted above the pump unit 284 is a right angle gear box assembly 286 having an input shaft which is drivingly connected to an intermediate portion of the longitudinal shaft 280, as by a belt and pulley assembly 288. The output shaft is drivingly connected with one end of a transversely extending shaft 290, the opposite end of which is connected to the input shaft of a gear box assembly 292. As shown in FIGURE 7, the gear box assembly 292 includes a rearwardly extending output shaft which is connected in driving relation to the roller 270 of the conveyor section 200 to drive the belt 272 thereof, as by a sprocket and chain assembly 294.

The gear box assembly 292 also includes a transversely extending output shaft which is drivingly connected, as by a shaft 296, to an aligned input shaft of a right angle gear box assembly 298. The upwardly extending output shaft of the gear box assembly 298 is connected, as by a universal joint 300, to the lower end of a hollow tubular square shaft 302. Telescopically mounted within the upper end portion of the shaft 302 is the lower end portion of a square shaft 304, the upper end of which is drivingly connected to the input shaft of a gear box assembly 306, as by a universal joint 308. The output shaft of the assembly 306 extends rearwardly and is drivingly connected with the upper rollers 218 and 236 of the vertical conveyor section 198 to effect opposite synchronous speed rotation thereto, as by a reversing sprocket and chain assembly 310. It will be seen that rotational movement of rollers 218 and 236 will effect movement of the associated outer belts 206 and 224 which, in turn, will impart movement to the associated inner belts 216 and 234 by virtue of their common movement beneath rollers 212 and 230.

Rack

Figures 10, 11:
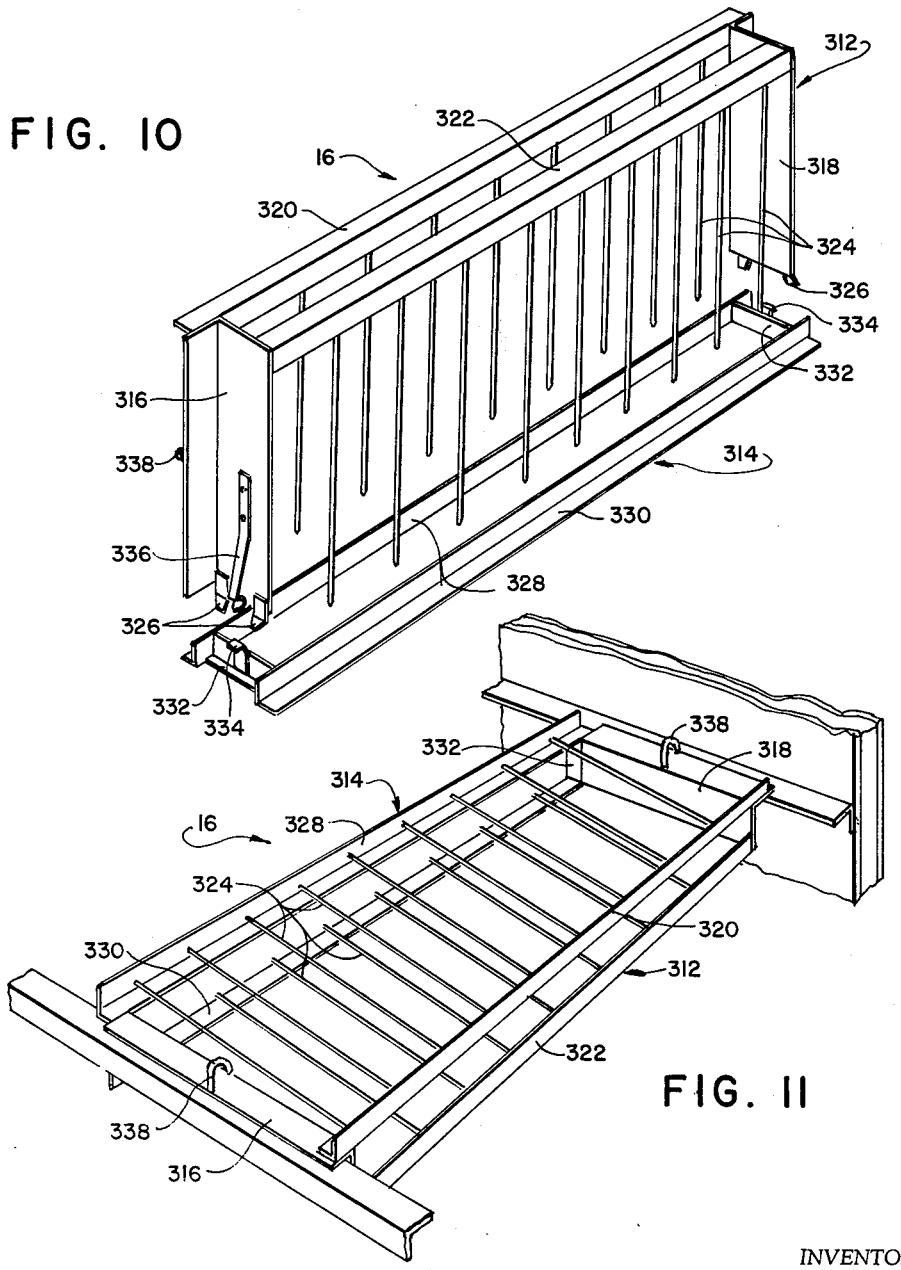
FIGURE 10 is a perspective view of the rack showing the rack sections exploded in the position in which they are loaded and secured together.
FIGURE 11 is a perspective view of the rack showing the rack sections secured together in the position in which they are handled and supported with the curing barn.

As best shown in FIGURES 9 and 10, each rack 16 utilized in connection with the present apparatus is particularly dimensioned to cooperate with the rack loading and securing mechanism 24 of the present apparatus. To this end, each rack 16 includes a pair of cooperating sections 312 and 314 which are moved apart to permit leaves to be loaded therein and are moved into cooperating latched relationship to secure the loaded leaves in baled condition. In secured relation, the bale provides peripheral confinement to the leaves in bulk form loaded therein. Thus, the section 312 includes a U-shaped frame, the legs of which are formed by angular members 316 and 318. These leg members are interconnected by a pair of transversely extending angle iron frame members 320 and 322.

As best shown in FIGURES 10 and 11 the ends of the angle iron frame member 322 are rigidly secured, as by welding or the like, in abutting relation to the lower corners of the vertical flanges of the angular leg members 316 and 318. In a like manner, the ends of the angle iron member 320 are secured, as by welding or the like, to the adjacent outwardly extending flanges of the angle iron leg members 316 and 318. Rigidly secured to the inwardly extending flanges of the angle iron frame members 320 and 322 is a plurality of prongs or elongated rods 324. The prongs 324 are spaced apart approximately 3¼ inches with the prongs secured to the angle iron member 320 spaced intermediate the prongs of the angle iron member 322. Preferably, these prongs extend at a slight angle with respect to the plane of the associated flanges so as to permit deflection of their outer ends in supporting relation to the other section 314 of the rack. Preferably, the outer ends of the prongs are sharpened to a blunt point to facilitate their penetration through the leaves.

Each of the leg members 316 and 318 is provided at the end thereof opposite from the angle iron members 320 and 322 with a pair of guide spaced plates 326 arranged to guidingly cooperate with the outwardly extending ends of a pair of angle iron frame members 328 and 330 forming a portion of the rack section 314. The angle iron members 328 and 330 of the section 314 are rigidly interconnected in spaced relation by end frame members 332 to which are secured spring latch members 334 arranged to cooperate with spring latch members 336 adjustably secured to the leg members 316 and 318 of the section 32. It will be seen that when the two sections are moved together the cooperating latch members will hold the sections in interengaged secured relation with respect to each other. It will also be noted that an apertured handling lug or inverted U-shaped rod 338 is fixedly secured to the central portion of the outwardly extending flange of each leg member 316 and 318.

*Rack Loading and Securing Mechanism*

The rack loading and securing mechanism 24 comprises, in general, a turntable 340 adapted to receive a pair of rack section receiving and tobacco leaf guide units 342 so as to position such units in a loading position to receive the leaves issuing from the belt 272 of the conveyor mechanism 22. After a sufficient number of leaves have been loaded at the loading position, the turntable 340 is rotated 180° so that the unit 342 which has been loaded is moved into a rack securing position. At this position, the unit 342 with the leaves loaded therein disposed above a rack section 312 mounted thereon is moved into cooperating relation with a mating rack section 314 until the rack sections are secured in latched relation in the manner described above.

Figure 15:
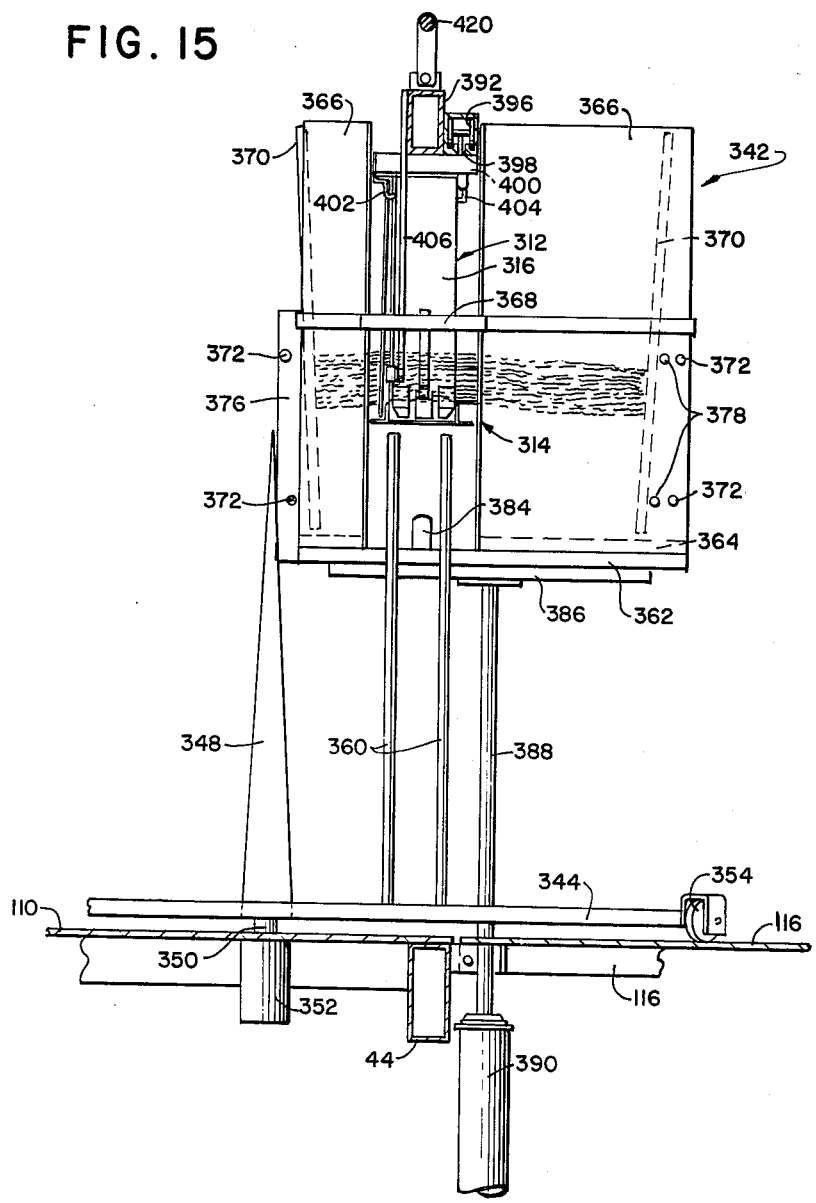
FIGURE 15 is a fragmentary sectional view similar to FIGURE 14 showing the rack loading and securing mechanism in a position just after the securement of the rack sections together.
Figure 16:
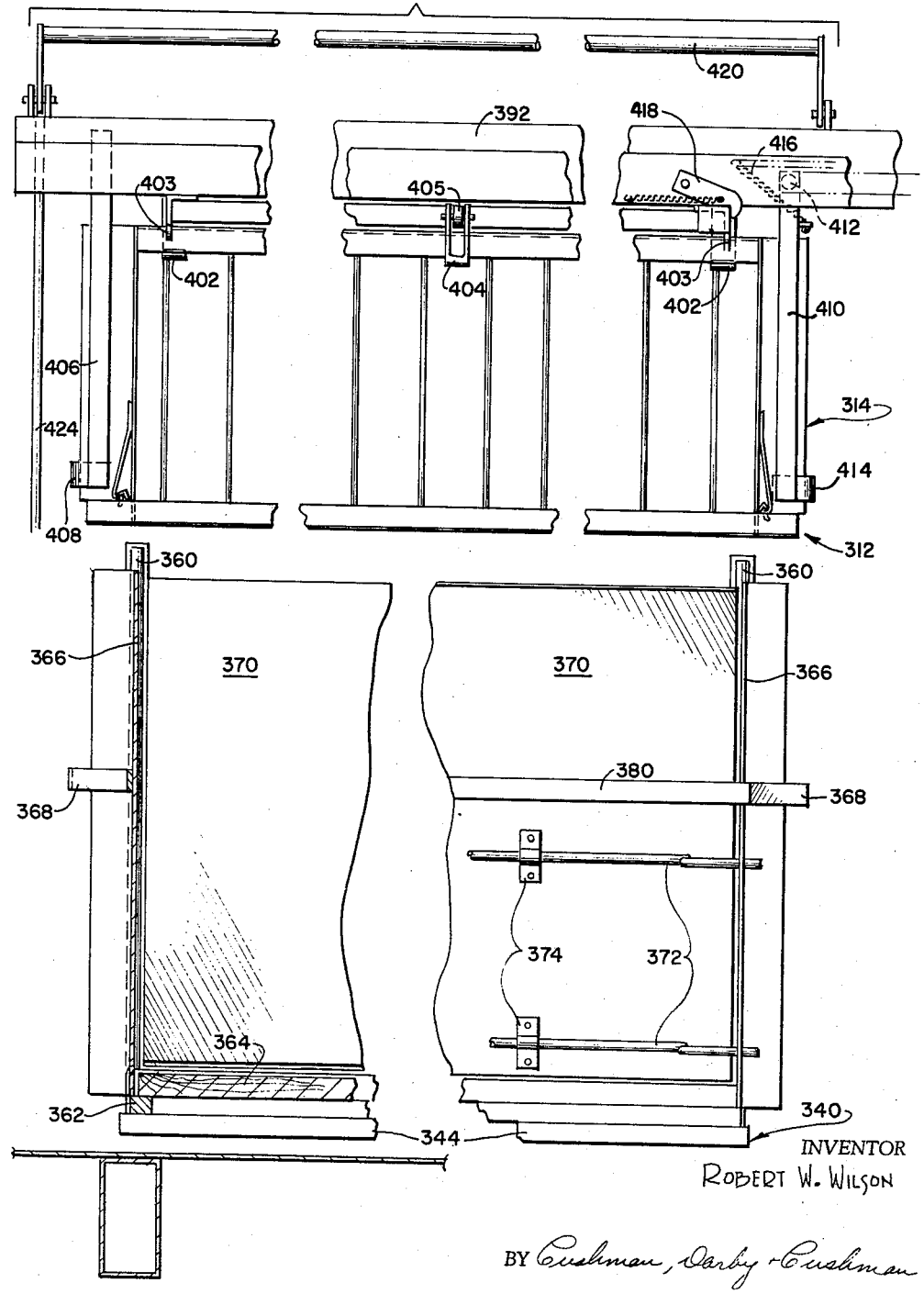
FIGURE 16 is an enlarged fragmentary sectional view taken along the line 16—16 of FIGURE 1.

As best shown in FIGURE 12, the turntable 340 comprises a peripheral horizontally extending frame 344 made up of rigidly interconnected side and end elongated frame members of angle iron construction disposed with one flange extending vertically upwardly and the other flange extending horizontally inwardly. Rigidly secured between the intermediate portion of the side frame members of the turntable frame is a horizontal brace 346 having an upwardly converging wedge shaped guide bar 348 secured to each end thereof, which divide the turntable frame 344 into two sections, each of which is adapted to receive one of the units 342. The central lower portion of the brace 346 has fixedly secured thereto and extending downwardly therefrom adjacent the central portion thereof a vertical shaft 350 which is journaled within a suitable thrust bearing assembly 352 formed on the horizontal platform section 32 of the vehicle frame, as shown in FIGURES 14 and 15.

Extending downwardly from each end frame member of the turntable frame 344 is a pair of spaced rollers 354 adapted to engage the sheet metal defining the floor 110 of the horizontal platform section 32 of the vehicle frame so as to support the turntable frame for rotary movement about the axis of the shaft 348. Preferably, a pair of pin locking assemblies 356 is mounted on the turntable frame in diametrically opposed relation for engagement within cooperating openings 358 in the floor 110 to lock the turntable in either one of two operative positions. The turntable frame also has rigidly secured thereto on opposite sides of the guide bars 348 opposed pairs of parallel, upwardly extending rack section receiving guide rods 360.

As best shown in FIGURE 13, each of the units 342 includes a skeletonized base 362 formed of a plurality of transversely extending frame members rigidly interconnected by a corresponding plurality of longitudinally extending frame members, the dimensions of the base 362 being sufficiently great to permit the latter to be supported on the horizontal flanges within the vertical flanges of the skeletonized frame 344 of the turntable 340 on either side of the guide bars 348. Mounted on the upper surface of the skeletonized base 362 is a pair of transversely spaced floor boards 364 spaced apart a distance sufficient to receive therebetween the rack section 314. Extending upwardly from the base adjacent the ends of each of the floor boards 364 is a vertical rectangular end wall 366, each aligned pair of walls being spaced apart a distance sufficient to receive therebetween one end of the rack section 314. Each pair of spaced aligned end walls 366 are braced by U-shaped straps 368. Mounted between the end walls 366 are spaced inner and outer side wall panels 370 which are disposed in an upwardly and outwardly diverging position with respect to each other and have their lower edges normally resting on the associated floor boards 364. Each side panel is mounted for upward and outward movement, by any suitable means, such as a parallel linkage in the form of a pair of elongated rods 372 bent to provide an elongated central portion pivoted to the outer surface of the associated wall panels 370, as by brackets 374, and laterally offset end portions. The end portions of the rods 372 associated with the inner side panel are pivoted in angle brackets 376 fixed to the adjacent edge of the end walls 366, while the end portions of the rods 372 associated with the outer side panel 370 are pivoted in selected set of spaced apertures 378 formed in the adjacent portion of the end walls 366. Suitable braces 380 are preferably provided between the brackets 376 and the outer edges of the end walls to strenghthen the entire construction.

Secured between the end frame members of the frame 362 at a position between the floor boards 364 is a T-shaped frame member 382, the upper surface of which is disposed in the same horizontal plane as the upper surface of the floor boards. Rigidly secured to each end of the T-shaped frame member 382 is an upstanding guide plate 384 having its upper end curved inwardly so as to engage the free ends of the leg members of the rack section 312.

At the rack securing position there is disposed at a position below the turntable frame 344 a horizontal skeletonized frame or member 386 which is secured to the upper end of a piston rod 388 extending through the floor 110 and forming a portion of a hydraulic ram unit 390 mounted at its lower end on the vehicle frame 10 adjacent the engine 82. The member 386 in its lowermost position is disposed above the floor 110 of the platform section 32 and is dimensioned so as to not interfere with the orbital path of the turntable rollers 354. As shown in FIGURE 1, the size of the member 386 is also such that it is capable of moving upwardly through the peripheral frame 344 of the turntable 340 to engage the base 362 of the unit 342 disposed in the rack securing position thereon. The member 386 actuated by the hydraulic ram unit 390 is thus adapted to engage the base of the loaded unit and effect a movement of the rack section 314 and leaves therein upwardly therewith into cooperating latched relation with a rack section 312 retained in position thereabove and to permit lowering of the empty unit back down onto the turntable 340, as is best shown in FIGURES 14 and 15.

*Rack Handling Mechanism*

The rack handling mechanism 26 includes a longitudinally extending horizontal guide beam 392 which is mounted as by end posts 394 extending upwardly from the platform section 32, in spaced relation above the platform floor of the vehicle frame. The beam 392, as shown, is constructed of a hollow rectangular structural member having a lighter channel member welded thereto which defines rail means to receive a pair of spaced guide roller assemblies 396, each having a stud 398 extending downwardly therefrom. Each stud 398 is secured to one end of a horizontally extending rectangular frame section 400 made up of longitudinal and transverse angle iron frame members interconnected at their ends, as by welding and the like. At spaced positions adjacent one side of the rectangular frame section 400 there are provided a pair of fixed rack supporting projections or hook members 402 adapted to receive one flange of the angle iron frame member 320 of the rack section 312, as shown in FIGURES 14-16 and 19 each member 402 having a spaced rigid cam member 403 associated therewith. At the opposite side of the frame section 400 adjacent the central portion thereof there is provided a pivoted hook-like latch member 404 having a handle 405 extending horizontally therefrom. The member 404 is engageable beneath the opposite angle iron frame member 322 of the rack section 312. In this way, the frame section 400 serves to receive and retain the rack section 312 for movement along the beam 392 into a position to engage cooperatively with the rack section 314 in the unit 342 disposed in the rack securing position during the upward movement of the ram unit member 386.

To aid in securing the rack section 312 in a position to be engaged by the rack section 314, there is provided a rigid arm 406 which is fixedly secured at its upper end to the beam 392 and has a U-shaped strap member 408 secured to the lower end thereof adapted to receive and support the associated flange of the leg member 316 of the rack section 312 adjacent the free end thereof against lateral movement. Mounted on the beam 392 in a position to cooperate with the leg member 318 of the rack section 312 is an arm 410 having its upper end pivoted, as at 412, to the beam 392 and its lower end provided with a U-shaped strap member 414 arranged to engage the associated flange of the leg member 318 adjacent the free end thereof. As shown, the arm 410 is resiliently biased, as by an overcenter acting spring 416, either into a vertical limiting position wherein the member 414 cooperates with the rack section, or into a horizontal limiting position wherein the arm is moved out of engagement to permit sliding movement of the frame section 10. Preferably, a latch member 418 which is spring pressed into opposed limiting positions in a manner similar to the arm 410 is provided on the beam 392 in a position to engage a horizontally extending handle 420 fixed to the frame 400 so as to retain the same in its rack securing position.

As a matter of convenience, an elongated horizontally extending actuating handle 420 is pivoted on the upper surface of the beam 392 and includes a horizontally extending arm 422 adjacent one end thereof which is connected with the upper end of an actuating rod 424 which extends through the floor 110 and is connected to a suitable control valve (not shown). It will be understood that by pivoting the handle 420 in one direction, the hydraulic ram 390 will be actuated to move the member 386 upwardly, while pivotal movement in the opposite direction will permit the member 386 to return to its lowermost position.

The rack securing mechanism also includes an inverted L-shaped boom 426 fixedly mounted on the upper surface of the beam 392 adjacent the rack handling position 18. The upper end of the boom 426 extends toward the rack supporting device 28 and has a pair of roller assemblies 428, similar to the roller assemblies 396 previously described, suspended therefrom. The roller assemblies 428 are adapted to engage within a short channel section 430 having a hook 432 fixed to the underside thereof adjacent one end thereof. Suspended on the hook 432 is a conventional hoist mechanism, generally indicated at 434. The hoist mechanism may be of any suitable design, and preferably is of the block and tackle type embodying electrical controls capable of effecting raising and lowering movement of a lower hook 436. Engaged on the hook 436, as by an eye 438, is an elongated bar 440 having a hook member 442 rigidly secured thereto in depending relation adjacent each end thereof. The hook members 442 are spaced apart a distance sufficient to engage within the U-shaped lugs 338 of the rack section 312. The frame section 400 is retained in a position to permit the hook members 442 to be engaged within the U-shaped lugs 338 by a spring pressed cam latching member 444 mounted on the end of the beam 398 in a position to engage the handle 420.

*Elevating Mechanism*

Figure 21:
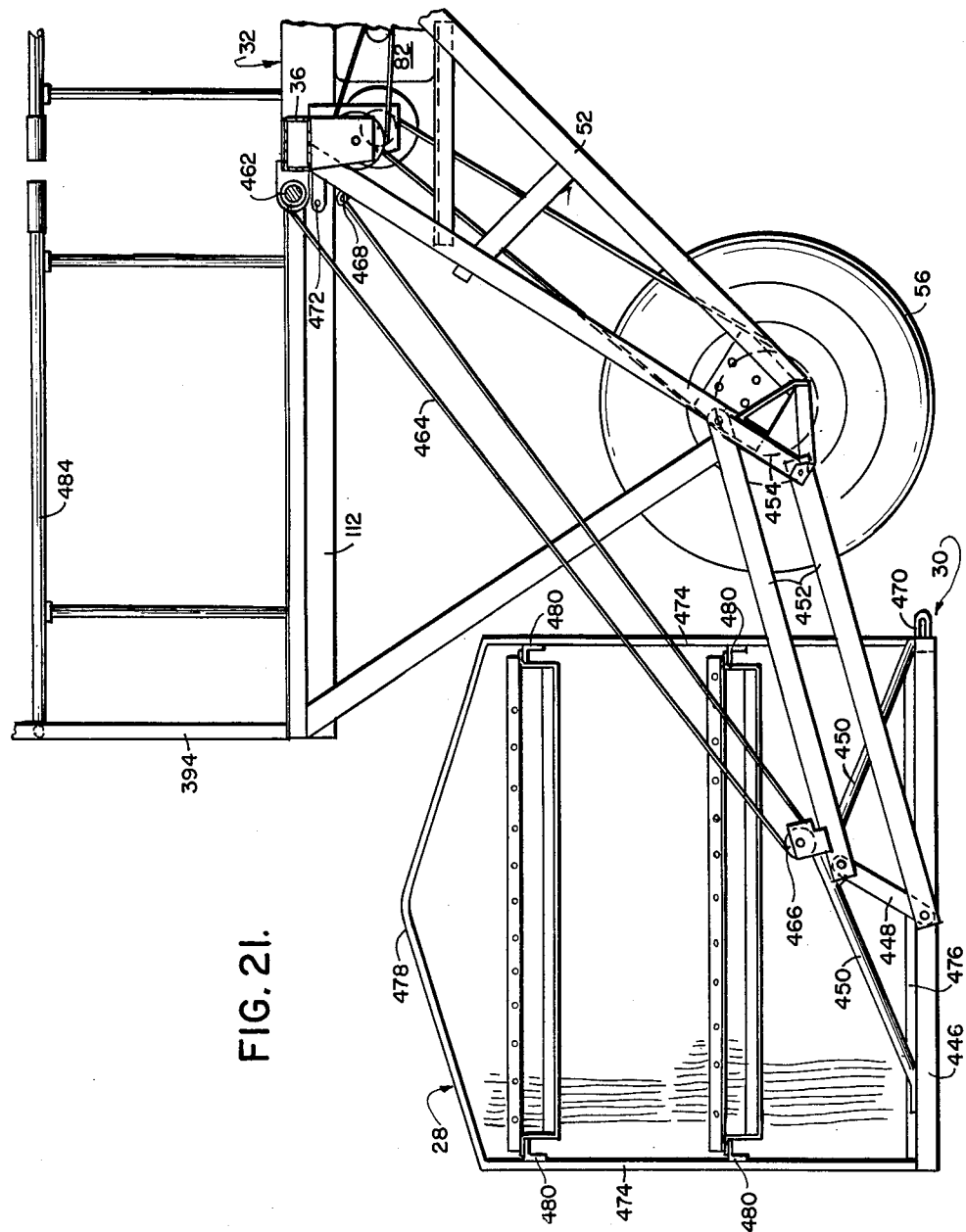
FIGURE 21 is an enlarged fragmentary elevational view of the elevating mechanism.

The elevating mechanism 30 for handling the rack supporting device 28 is best shown in FIGURES 2 and 21 and comprises a horizontally extending U-shaped frame 446 of any suitable construction, such as square tubular frame members welded together. Rigidly secured to the intermediate portion of each of the legs of the U-shaped frame 446 is the lower end of an upwardly inclined bar 448 having its upper end strengthened by diagonal braces 450 secured to the associated leg of the frame. Each bar 448 has the rear ends of a pair of parallel links or arms 452 pivotally mounted on the ends thereof and the forward ends of each pair of arms are pivotally connected with the ends of a parallel bar 454 secured to the lower portion of the associated rear wheel frame section 52 or 54. The parallel arm arrangement permits the U-shaped frame 446 to be moved translationally upwardly and downwardly between a lower position generally at ground level and a raised position generally at the level of the platform section floor 110.

In order to effect the raising and lowering of the U-shaped frame 446, any suitable means may be provided, such as a pair of drums 456 fixedly secured to the ends of a shaft 458 suitably journaled adjacent the rear transverse vehicle frame member 36. Any suitable means may be provided for effecting rotation of the drums 456 on the shaft in one direction and, as shown in FIGURES 1, 2 and 21, such means embodies a hydraulic motor 460 having an output shaft drivingly connected with the shaft 458, as by a speed reducing dual sprocket and chain assembly 462. Suitable controls (not shown) for the hydraulic motor are extended to the control box 108 adjacent the driver's seat 72. It will be seen that by properly actuating the hydraulic motor 460, the shaft 458 will be turned to likewise effect a turning movement of the drums 456. Each of the drums has one end of a cable 464 fixedly secured thereto, the opposite end portion of which extends around a sheave 466 mounted on the rear end of the upper arm of the associated pair of arms 452 and then secured to the vehicle frame, as indicated at 468, so that when the drums are rotated in response to the actuation of hydraulic motor, the U-shaped frame will be raised through the operation of the cables 464. The weight of the frame itself is sufficient to effect the lowering movement. Preferably, cooperating latching elements 470 and 472 are provided between the central portion of the U-shaped frame 446 and the vehicle frame member 36, respectively so that the latter is positively locked in its upper position. It will be understood that the U-shaped frame 446 is of such a size as to receive and support the rack supporting device 28 as shown in FIGURE 21.

*Rack Supporting Device*

The rack supporting device 28 is best shown in FIGURES 21 and 26 and comprises a pair of side walls 474 which are preferably constructed of laminated panels, as for example, inner and outer panels of Masonite having suitable insulating material therebetween. The side walls are connected along their lower edges by spaced floor slats 476 which serve to retain the lower portions of the side walls in rigid spaced relation. The upper ends of the side walls are connected by a pitched roof 478 which is likewise preferably made of heat insulated laminated panels. Mounted on the interior surface of each of the side walls 474 is a pair of vertical spaced horizontally extending angle irons 480 which serve as rail means to engage and support the outwardly extending flanges of the leg members 316 and 318 of the rack sections 312. As shown, the device 28 is open at both ends and the side walls 474 are of such a dimension as to receive approximately five abutting racks 16 mounted on the rails 480 extending therethrough. Since there are two cooperating rails provided at two different vertical levels, the entire device 28 as shown, is capable of receiving ten loaded racks.

Preferably, the lower edge surface of the side walls are provided with longitudinally extending runners 482 to aid in handling the device. The rack supporting device 28 is thus adapted to engage on the upper surface of the U-shaped frame 446 of the elevating mechanism 30 and when the latter is disposed in its upper position, one open end of the container will be disposed in a position facing the rack handling station 18 on the vehicle frame.

Operation of the Apparatus

The apparatus of the present invention is capable of being operated by two attendants, one stationed on the driver's seat 72 and the other on the platform 32 of the vehicle frame 10 for operation between the rack loading and securing position 14 and rack handling position 18 and, as a safety measure, a suitable hand rail 484 is removably mounted adjacent the forward and left hand edges of the platform. However, it is desirable to employ a third attendant on the platform to aid in the rack securing and handling operations. The driver, on the seat 72, controls the movement of the vehicle, the drive for the defoliating mechanism 20 and conveyor mechanism 22, and, particularly, the raising and lowering of the frame 132 to position the defoliating units 126 at the desired height with respect to the plants. Preferably, the forward speed of the vehicle is within the range of two to three miles per hour, a preferred speed being 2½ miles per hour. It has been found that this speed, depending upon the length of the plant rows, is capable of delivering to the rack loading and securing mechanism 24 enough leaves so that a rack can be filled every four to six minutes, with each rack containing approximately 130 pounds of tobacco leaves.

As indicated above, the main concern of the driver is to keep a close scrutiny on the plants as he passes by the same, just prior to the engagement by the defoliating mechanism 20. The driver has ample opportunity to actuate controls for elevating the frame 132 to position the defoliator so as to engage only those leaves on the lower portion of each stem which he considers to be ripe.

The particular manner in which the defoliating mechanism 20 serves to remove the leaves engaged thereby from the stalks of the plant is fully disclosed in the above-mentioned patents. Suffice it to say that the engaged leaves are removed by the defoliating mechanism 20 during the movement of the vehicle frame 10 through the field and these leaves are picked up on the upper substantially horizontal runs of the belts 206 and 224 and then carried upwardly either between the cooperating belts 206 and 216 or the cooperating belts 224 and 234. The leaves thus moved upwardly are discharged between the rollers 218 and 236 and deposited on the upper flight of the belt 272. In actual operation, it has been found that a strong wind in the field can have an appreciable effect on the movement of the leaves between the upper rollers 218 and 236 onto the belt 272. If desired, an accordian-type shroud or the like (not shown) may be provided around the upper end of the conveyor 198 in surrounding relation to the conveyor 200 so as to protect this area against the effects of wind. The leaves issuing from the belt 272 are deposited into the unit 342 disposed in the loading position, as shown in the left hand side of FIGURE 14. Here again, in order to eliminate the effects of wind and the like, there is provided a vertical guard plate 486 mounted in a vertical position above the axis of the turntable 340, by any suitable means, such as braces 488 secured between the beam 392 and the conveyor braces 268. In addition to the above, the discharge end of the belt 272 may be provided with a guide plate 490 which extends downwardly therefrom, the plate serving as a means for doctoring the leaves off of the conveyor belt which is sometimes necessary when the leaves are wet from a rain or heavy dew. In a like manner, the discharge end of the belt 224 can be similarly doctored, if desired.

One of the duties of the attendant stationed on the platform 32 is to assist in distributing the leaves within the unit 342 being loaded. The only requirement with respect to the loading of the units 342 is that the leaves must be generally equally distributed throughout the same and the flat surfaces of the leaves must be disposed generally in one direction with a substantial portion of the flat surfaces being disposed in parallel relationship, which during the loading operation would be substantially horizontal.

It will be understood that prior to the commencement of the filling operation of the unit 342 to be filled, a rack section 314 is moved over the guide rods 360 which engage within the interior corner of the rack section, the latter being moved into supporting relation to the base 362 of the unit between the end walls 366.

When the unit 342 has been filled, the operator disengages the locking pin 358 and effects a manual rotational movement of the turntable 340 about the shaft 350 to an extent of 180°, so as to move the filled unit 342 into the rack securing position, shown at the right in FIGURE 14, and an empty unit 342 having a rack section 314 mounted therein into the loading position. Conveniently, the rack sections 314 may be stored on the forward portion of the platform 32, although alternatively, they may be stored in the bottom of the rack supporting device 28. The rack sections 312 are preferably stored in the bottom of the device 28 and they are moved into supporting relation to the frame section 400 preferably at the rack handling station 18. The rack section 312 is moved into supporting engagement with the frame section 400 by simply lifting the rack section upwardly until the prong carrying flange of the frame member 320 is supported in the lower portion of the hook members 402. Next, the other rack frame member 322 is swung upwardly until latch member 404 engages below the same. During this movement the cam members 403 serve to move the entire rack section forwardly until the other flange of the rack frame member 320 are supported in the upper portion of the hook members 402.

The rack section 312 thus supported on the frame section 400 is moved along the beam 392, as by handle 420 into the rack securing position above the loaded unit 342. It will be noted that the leading flange of the leg member 316 will engage within the strap member 408 on the arm 406 to limit the movement of the rack and positively position the same in the rack securing position in accurate registry with the frame section 314 therebelow. In order to retain the rack section 312 in this position, the locking member 418 is pivoted downwardly into engagement with the handle 420, and in addition, the arm 410 is pivoted into its vertical limiting position wherein the strap member 414 engages the associated flange of the rack leg member 318. In this way, the rack section 312 is positively held in position.

Next, the attendant moves the actuating handle 420 to actuate the hydraulic ram unit 390 and effect an upward movement of the member 386. As best shown in FIGURE 15, the member 386 during its upward movement engages the base 362 of the loaded unit 342 and carries the same upwardly therewith. During this upward movement the guide rods 360 serve to maintain the rack section 314 in proper position to engage the cooperating rack section 312. Just prior to the final upward movement of the member 386, the guide members 384 will engage the interior surface of the free ends of the rack leg members so as to positively move the same, if necessary, into a position such that the cooperating latching elements 334 and 336 on the rack sections will engage each other.

After the rack sections 312 and 314 have been moved into latched relationship, the operator moves the actuating handle 420 to permit downward movement of the member 386 and the unit 342 supported thereby. In this regard, it will be noted that during the movement of the rack sections together, the leaves disposed within the unit 342 will be vertically compressed and this compressive action tends to apply greater forces to the side panels 370. The side panels 370 diverge upwardly to alleviate this condition somewhat and, in addition, during the initial portion of the downward movement of the unit 342 after the rack sections have been secured, the side panels 370 are free to move outwardly by the action of the parallel linkage rods 372, thus further permitting free downward movement of the unit 342 without damaging effect to the leaves. As soon as the empty unit 342 is moved back into supporting relation with the turntable floor, a new rack section 314 is moved into supporting relation therewith over the guide rods 360.

The loaded rack supported in the rack securing position by the frame section 400 is then moved along the beam 392, by the handle 420, into the rack handling station 18 after first moving the latch member 418 and the arm 410 to their upper inoperative positions. When the frame section 400 reaches the rack handling station, the handle 420 will pivot the locking element 444 upwardly and the latter will then retain the frame section 400 in proper position, as shown in dotted lines in FIGURE 19. The operator next disengages the central hook member 404 which shifts the support of the loaded rack onto the lower portion of the hook members 402, as shown in phantom lines in FIGURE 19. Next, the operator actuates the hoist mechanism 434 into a position where the hook members 442 can be engaged within the U-shaped lugs 338 on the rack. The rack can then be simply lifted from its support on the hook members 402 and allowed to move into the full line horizontal position shown in FIGURE 19, fully supported by the hoist mechanism 434. From this position the operator simply pushes the rack section onto the supporting rails 480 in the device 28 after suitably manipulating the hoist mechanism 434. It will be understood that after the loaded rack is moved into supporting relation to the rails 480, the hook members 442 are disengaged and then the operator obtains a new rack section 312 from the bottom of the device 28 and secures the same to the frame section 400 in the manner indicated above and then moves the new rack section into the rack securing position in the manner indicated above.

As previously stated, it is possible for one attendant to take care of all of the above operations necessary in connection with the handling of a loaded rack during the loading of the other unit 342 disposed in the loading position. Where two attendants are stationed on the upper platform, one attendant merely serves to equally distribute and generally orient the leaves loaded within the unit 342 at the loading position while the other attendant takes care of the various operations required in securing the rack sections together and moving the loaded racks into the supporting device 28.

As already stated, the normal operation of the apparatus is such that a loaded rack will be moved into the device 28 every four to six minutes, depending upon the amount of time required to effect turning operations from one row to another. Thus, the supporting device 28, which, as shown, holds ten racks, will be loaded in approximately 40 to 60 minutes. Preferably, at this time, a flat bed trailer is moved into the field, as by a tractor or the like, the trailer having mounted thereon an empty device 28 having ten empty racks 16 mounted in the bottom thereof. The empty device is then moved onto the ground and the device 28 with ten loaded racks supported therein is lowered onto the trailer by actuating the elevating mechanism 30. The trailer is then driven to the curing station and the empty supporting device 28 is moved onto the elevating mechanism frame 446 and then raised into its uppermost position. Of course, the vehicle itself can be utilized to transport the loaded rack to the curing station, in which case, the elevating mechanism 30 can be conveniently employed at the curing station to lower the loaded device 28 into position and pick up an empty device.

*Modifications*

It will be understood that the specific construction of the invention thus far described constitutes a preferred embodiment thereof but that may modifications of the specific structure may be employed within the principles disclosed. Preferably, the vehicle frame 10 is of the self-propelled type described above although it will be understood that it may be embodied in a trail-behind vehicle of the type adapted to be propelled by a tractor or the like, or the vehicle frame may be mounted on the tractor itself. Moreover, while it is preferred to provide the defoliating station 12, baling station 14 and rack handling station 18 on the vehicle frame 10 in the positions described, these positions may be suitably varied, if desired.

As has already been described, the defoliating mechanism 20 utilized may take several forms as exemplified in the above-mentioned Wilson and Wilson et al. patents and the Splinter application. In the preferred embodiment shown, the leaves are defoliated from a single row of tobacco plants during the passage of the vehicle frame 10 through the field even though the vehicle frame itself straddles two rows of tobacco plants. While this arrangement is preferred in that with the preferred forward speed of the vehicle in the range of 2 to 3 miles per hour a single defoliating mechanism 20 acting on a single row of plants is capable of delivering to the rack loading and securing mechanism 24 enough leaves so that a rack will be filled every four to six minutes. This speed of operation permits a single attendant stationed on the platform section 32 of the vehicle frame 10 to secure each rack together and move the same into the device 28 in the time allotted. While this arrangement is preferred it would be possible to provide two defoliating mechanisms 20 for removing the leaves from two rows of plants simultaneously by either slowing down the speed of travel or providing additional attendants on the upper platform to aid in the above-mentioned procedure.

It is also within the contemplation of the present invention to eliminate the defoliating mechanisms 20 at the defoliating station 12 and provide in lieu thereof seats (not shown) to accommodate a plurality of primers to manually remove the leaves from the plants. Thus, the term "defoliating station" as used herein contemplates a space or area in which there are one, two or several different positions at which defoliation may take place either mechanically or manually.

The construction of the conveyor mechanism 22 is suited to the position of the various stations on the vehicle frame. Where the vertical inclination between the defoliating station and the baling station is relatively slight, it is possible to convey the leaves on a single supporting belt, such as that disclosed in Wilson Patent 2,816,411. With the position of the stations as previously described it is necessary to provide cooperating belts which engage the leaves therebetween to effect a substantial vertical movement thereof. Where manual defoliation is contemplated special conveyors may be employed.

As indicated above, the rack loading and securing mechanism 24 described above requires at least one attendant for the proper functioning thereof. As previously stated, such an attendant would have an opportunity among his other duties to aid in distributing the leaves issuing from the conveyor section 200 into the unit 342 at the loading position.

While the preferred embodiment of the rack loading and securing mechanism contemplates the provision of spaced loading and rack securing positions, it is within the contemplation of the present invention to effect loading and rack securement in the same position. FIGURES 22–25 illustrate a modified form of rack loading and securing mechanism 620 utilizing this variation. Instead of providing units 342 which are movable between spaced loading and rack securing positions, the rack loading and securing mechanism 620 provides two fixed units 622 which are constructed similar to the units 342 previously described with corresponding parts indicated by corresponding primed numerals.

In order to effect the alternate loading of the fixedly spaced units 622, the conveyor section 200 is replaced by a conveyor section 624 which includes a drive roller 626, similar to the roller 270 but of lesser diameter, a trough shaped roller assembly 628 and a belt 630 trained thereabout. Disposed below the roller assembly 628 is a conventional belt conveyor assembly 632 suitably mounted for pivotal movement about a vertical axis as indicated at 634. The outer end of the conveyor section is thus movable between positions disposed over the respective fixed units 622, while the inner end thereof is at all times disposed in a position to receive the leaves issuing from the trough shaped end of the belt 630. The pivoted conveyor assembly 632 may be driven by means of a motion transmitting mechanism similar to that previously provided but modified with suitable telescopic shaft and universal assemblies of the type utilized in driving the defoliating units and conveyor section 198 to compensate for horizontal swinging movement, may be driven by a flexible shaft, or by a separate motor (not shown) mounted on the conveyor assembly frame for pivotal movement therewith. The rack loading and securing mechanism 620 also includes a beam 636 similar to the beam 392 but provided with a right angle arcuate portion between the units 622 so that a rack securing mechanism 638 carried thereby can be positioned above either of the fixed units 622.

The rack securing mechanism 638 includes a pair of longitudinally spaced roller assemblies 640 mounted in the channel of the beam 636, each of which is vertically swivelly connected to a horizontally extending rectangular frame section 642. The frame section 642 has four vertical guide openings therein within which four tubular members 644 are slidably mounted for vertical movement with respect thereto adjacent the outer side of the beam. The upper ends of the tubular members 644 are secured together by an upper frame section 648 above the beam 636 and the lower ends are secured together by a frame section 650 disposed below the frame section 642.

Any suitable means may be provided for effecting a power operated vertical movement of the upper and lower frame sections 648 and 650 with respect to the frame section 642 in both directions. For example, as shown, there is mounted on the frame section 648 a power operated winch unit 652 having a drum assembly to which are attached the ends of two cables 654 and 656. The cable 654 has its opposite end connected to the upper frame section 648 and is adapted to pay out in response to rotation of the drum assembly in one directon while the cable 656 has its opposite end connected to the lower frame section 650 and is adapted to be reeled in response to rotation of the drum assembly in said one direction. Of course, by reversing the direction of movement of the drum assembly of the winch unit 652, power operated movement in both directions can be achieved.

The lower frame section 650 is equivalent to the frame section 400 and is provided with spaced fixed hook members 658 and a central pivoted hook member 660 similar to the hook members 402 and 404 previously described for supporting the rack section 312. FIGURE 24 shows another modification wherein the L-shaped boom 426 may be mounted for swinging movement about the axis of a vertical post 662 which receives the same.

In the operation of the rack loading and securing mechanism 620, when one of the units 622 is filled with leaves, the attendant pivots the conveyor assembly 632 so that it will deposit leaves in the other empty unit 622. The rack securing mechanism 638 is then moved to a position above the filled unit 622 and the winch unit 652 is actuated to effect downward movement of the rack section 312 carried by the frame section 650. This downward movement is continued until the cooperating rack sections 312 and 314 are latched by their movement together and then the secured-together rack sections are moved upwardly by reversing the direction of rotation of the winch unit 652, thus removing the rack sections 312 and 314 with the leaves supported therein from the unit 622.

As indicated above, it is preferable to utilize a plurality of devices 28 in handling the loaded racks on the vehicle frame, in transporting the loaded racks on the vehicle frame to the curing station and in forming a portion of the curing barn structure. However, it is within the contemplation of the present invention to utilize an intermediate type device, that is, one which merely serves to support the racks on the vehicle and for transportation to the curing station. Such intermediate type devices would be utilized with permanent barn installations at the curing station and the racks within the intermediate type device would merely be transferred from the device into the permanent barn structure for curing.

The preferred form of rack supporting device 28 is provided with runners or skids 482 which are adapted to cooperatively engage on the elongated foundation walls 606 of the barn construction of the present invention. With this arrangement, the lower duct of the completed barn is provided by the permanent structure. It is within the contemplation of the present invention to form this lower duct section by the devices 28 themselves. That is, instead of providing an open floor structure in the device, the floor could be made imperforate and disposed in spaced relation to the lower surfaces of the leaves. Such an arrangement would lend itself readily to the simple mounting of the device on wheels in which case the entire device could be moved behind the present vehicle frame 10 and loaded directly by the hoist unit 434. In any event, the detachably mounted or integrally mounted wheels would eliminate the necessity of providing an elevating mechanism 30 for mounting the device on a trailer for transportation from the vehicle frame to the curing station.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

What is claimed is:

1. Apparatus for loading defoliated tobacco leaves into a rack of the type including relatively movable sections which together provide means for peripherally confining a batch of leaves disposed with their flat surfaces generally in one direction and a substantial portion of the flat surfaces thereof in substantially parallel relation and spaced prong means extending within the confining means in piercing relation to the leaves in a direction perpendicular to the parallel flat surfaces thereof so as to provide interior support for the leaves while permitting flow of air between said leaves within the confining means in the direction of extent of the parallel flat surfaces thereof, said apparatus comprising first means for collecting a batch of leaves, second means for collecting a batch of leaves, conveyor means for conveying successive defoliated tobacco leaves from a source, means for effecting a relative movement between said conveyor means and said first and second means into a first operative position wherein said conveyor means and said first means are disposed in cooperating relation such that the leaves can be conveyed from said conveyor means to said first means with their flat surfaces disposed in one direction until a batch is collected therein and a second operative position wherein said conveyor means and said second means are disposed in cooperating relation such that leaves can be conveyed from said conveyor means to said second means with their flat surfaces disposed in one direction until a batch is collected therein and means for effecting a relative movement between cooperating rack sections from an open position into a position wherein the cooperating rack sections are together in supporting relation to the batch of tobacco leaves collected in said first means when said conveyor means and said first means are in a position other than said first operative position and for effecting a relative movement between cooperating rack sections from an open position into a position wherein the cooperating rack sections are together in supporting relation to the bunch of tobacco leaves collected in said second means when said conveyor means and said second means are disposed in a position other than said second operative position.

2. Apparatus as defined in claim 1 wherein said first and second means comprises a pair of similar rack section receiving and tobacco leaf guide units.

3. Apparatus as defined in claim 2 wherein said means for effecting relative movement between said conveyor means and said first and second means comprises a turntable mounted for rotary movement about a vertical axis, said pair of units being mounted on said turntable in spaced side by side relation, said conveyor means being mounted for operation in a fixed position so that said units mounted on said turntable can be moved into said operative positions by rotational movement of said turntable.

4. Apparatus as defined in claim 2 wherein said means for effecting relative movement between said conveyor means and said first and second means comprises means for supporting said units in spaced positions, and means mounting said conveyor means for movement between said two positions.

5. Apparatus as defined in claim 2 wherein said rack section moving means includes a power operated member mounted for upward vertical movement into supporting relation to each of said units and a rack section supported thereby to effect upward movement of the unit and rack section together until the rack section is moved together with a cooperating rack section supported in fixed position thereabove and for downward vertical movement to lower the empty unit away from the rack supported thereabove.

6. Apparatus as defined in claim 2 wherein said rack section moving means comprises a power operated cooperating rack section receiving and supporting member mounted for downward vertical movement with a cooperating rack section supported thereby until the latter is moved together with a rack section supported by a unit and for upward vertical movement to raise the rack from the unit supported therebelow.

7. Apparatus as defined in claim 2 wherein each of said units includes a bottom wall shaped to accommodate a rack section thereon, opposed end walls extending upwardly from opposite ends of said bottom wall and a side wall extending upwardly from each side of said bottom wall between the ends walls.

8. Apparatus as defined in claim 7 wherein said means for effecting relative movement between said conveyor means and said first and second means comprises a horizontally extending frame section, means mounting said frame section for rotary movement about a central vertical axis, said frame section having vertical guide means fixed thereon for receiving a rack section and guiding the same into supporting relation on the associated unit, said units being removably mounted on said frame section in substantially side by side relation.

9. Apparatus as defined in claim 8 wherein said frame section includes vertical openings disposed centrally below the units supported thereon and wherein said rack section moving means comprises a member mounted for vertical movement from a position below said frame section upwardly through a vertical opening therein to engage the unit supported thereabove and move the same upwardly.

10. Apparatus as defined in claim 1 wherein said rack section moving means comprises upper and lower vertically spaced members, said upper member having means thereon for suspending a rack section in a position above a cooperating rack section having a batch of leaves disposed thereon supported therebelow in a position above said lower member, means for effecting a relative vertical movement between said members toward each other to move the rack sections together into supporting relation to the batch of tobacco leaves and away from each other to permit the loaded rack to remain suspended by said suspending means, said suspending means including means operable to effect movement of the lower rack into a vertically inclined position.

11. Apparatus as defined in claim 10, including hoist means engageable with the loaded rack for supportingly moving said rack from said suspending means and supporting the same in a substantially horizontal position.

12. Apparatus as defined in claim 11, including a device for receiving and supporting a plurality of loaded racks, said hoist means being operable to effect movement of successive loaded racks into supporting relation with said device.

13. Apparatus for handling racks of the type including relatively movable sections which together provide means for peripherally confining a batch of tobacco leaves disposed with their flat surfaces in one direction and with a substantial portion of the flat surfaces thereof in substantially parallel relationship and spaced prong means extending within the confining means in piercing relation to the leaves in a direction perpendicular to the parallel flat surfaces thereof so as to provide interior support for the leaves while permitting flow of air between the leaves within the confining means in the direction of extent of the parallel flat surfaces thereof, said apparatus comprising upper and lower vertically spaced members, said upper member having means thereon for suspending a rack section in a position above a cooperating rack section thereon supported therebelow in a position above said lower member, means for effecting a relative vertical movement between said members toward each other to move the rack sections together into supporting relation to a batch of tobacco leaves disposed therebetween and away from each other to permit the loaded rack to remain suspended by said upper member suspending means, and means engageable with the loaded rack of supportingly moving said rack from said upper member suspending means and supporting the same in a substantially horizontal position.

14. Apparatus as defined in claim 13, including rail means mounting said upper member for horizontal movement therealong.

15. Apparatus as defined in claim 14 wherein said rack moving means includes hoist means.

16. Apparatus as defined in claim 15, including a device for receiving and supporting a plurality of loaded racks, said hoist means being operable to effect movement of successive loaded racks into supporting relation with said device.

17. Apparatus operable during the harvesting of tobacco leaves in a tobacco field for compressing successive batches of harvested tobacco leaves in bulk form with the flat surfaces thereof disposed generally in one direction and with a substantial portion of the flat surfaces of the leaves generally parallel into successive racks of the type including relatively movable sections which together provide means for peripherally confining a batch of leaves and spaced prong means extending within the peripheral confining means in piercing relation to the batch of leaves in a direction generally perpendicular to the parallel flat surfaces thereof so as to provide interior support for the leaves while permitting flow of air between the leaves within the confining means in the direction of disposition of the flat surfaces thereof, said apparatus comprising frame means supported for movement through a tobacco field, a leaf defoliating station on said frame means at which tobacco leaves are removed from the tobacco plants during the movement of the frame means through the field, a baling station on said frame means spaced from said leaf defoliating station, conveyor means on said frame means for receiving the removed leaves at said defoliating station and conveying the same to said baling station, means on said frame means at said baling station for receiving and supporting successive batches of leaves in bulk form with the flat surfaces thereof disposed generally in one direction and with a substantial portion of the flat surfaces of the leaves generally parallel, and means at said baling station guiding successive rack sections for relative movement together from a position in spaced apart relation with a batch of leaves disposed therebetween so that during such relative movement the prong means thereof is pierced through said leaves in a direction generally perpendicular to the generally parallel leaves thereof and the batch of leaves is compressed into supporting relation to the rack.

18. Apparatus as defined in claim 17 including means on said frame means disposed in spaced relation to said baling station for supporting a device capable of receiving and supporting a plurality of loaded racks, and rack moving means for supporting successive loaded racks for movement into supporting relation with said device.

19. Apparatus as defined in claim 18 wherein said device supporting means comprises a horizontally extending frame section, means connected between said frame means and said frame section supporting the latter for vertical movement between a lowered position adjacent the ground and a raised position at a height sufficient to permit a mature tobacco plant to pass thereunder, and power operated means for effecting movement of said frame section from said lowered position to said raised position.

20. Apparatus as defined in claim 18 including a device mounted on said device supporting means, said device comprising a pair of upright imperforate walls, an imperforate roof extending between the upper portion of said walls, rail means on said walls extending in horizontal relation substantially throughout the longitudinal extent of said walls for slidably receiving and supporting a plurality of loaded racks, the ends of said device being open, said walls and roof having means on each of the ends thereof for substantially sealingly abutting the opposite end of a similar device.

21. Apparatus operable during the harvesting of tobacco leaves in a tobacco field for compressing successive batches of harvested tobacco leaves in bulk form with the flat surfaces thereof disposed generally in one direction and with a substantial portion of the flat surfaces of the leaves generally parallel into successive racks of the type including relatively movable sections which together provide means for peripherally confining a batch of leaves and spaced prong means extending within the peripheral confining means in piercing relation to the batch of leaves in a direction generally perpendicular to the parallel flat surfaces thereof so as to provide interior support for the leaves while permitting flow of air between the leaves within the confining means in the direction of disposition of the flat surfaces thereof, said apparatus comprising frame means supported for movement through a tobacco field, a leaf defoliating station on said frame means at which tobacco leaves are removed from the tobacco plants during the movement of the frame means through the field, a baling station on said frame means spaced from said leaf defoliating station, conveyor means on said frame means for receiving the removed leaves at said defoliating station and conveying the same to said baling station, a turntable mounted on said frame means at said baling station for movement about a vertical axis, said turntable having a plurality of leaf receiving and supporting means thereof movable with said turntable between leaf loading and rack securing positions, each of said leaf receiving and supporting means when disposed in said leaf loading position being operable to receive a batch of tobacco leaves and support the same in bulk form with their flat surfaces disposed generally in one direction and a substantial portion of their flat surfaces generally parallel, and means at said baling station guiding successive rack sections for relative movement together from a position in spaced apart relation with a batch of leaves disposed therebetween so that during such relative movement the prong means thereof is pierced through said leaves in a direction generally perpendicular to the generally parallel leaves thereof and the batch of leaves is compressed into supporting relation to the rack.

22. Apparatus operable during the harvesting of tobacco leaves in a tobacco field for compressing successive batches of harvested tobacco leaves in bulk form with the flat surfaces thereof disposed generally in one direction and with a substantial portion of the flat surfaces of the leaves generally parallel into successive racks of the type including relatively movable sections which together provide means for peripherally confining a batch of leaves and spaced prong means extending within the peripheral confining means in piercing relation to the batch of leaves in a direction generally perpendicular to the parallel flat surfaces thereof so as to provide interior support for the leaves while permitting flow of air between the leaves within the confining means in the direction of disposition of the flat surfaces thereof, said apparatus comprising frame means supported for movement through a tobacco field, a leaf defoliating station on said frame means at which tobacco leaves are removed from the tobacco plants during the movement of the frame means through the field, a baling station on said frame means spaced from said leaf defoliating station, conveyor means on said frame means for receiving the removed leaves at said defoliating station and conveying the same to said baling station, first means on said frame means at said baling station for receiving and supporting a rack section, second means on said frame means at said baling station for receiving and supporting a similar rack section, means on said frame means at said baling station for effecting a relative movement between said conveyor means and said first and second means into a first operative position wherein said conveyor means and said first means are disposed in cooperating relation such that the leaves can be conveyed from said conveyor means to said first means with their flat surfaces extending generally in one direction until a batch is collected in cooperating relation with the rack section received and supported by said first means and a second operative position wherein said conveyor means and said second means are disposed in cooperating relation such that the leaves can be conveyed from said conveyor means to said second means with their flat surfaces extending generally in one direction until a batch is collected in cooperating relation with the rack section received and supported by said second means, and means for effecting a relative movement between a cooperating rack section and the rack section supported by said first means from a spaced apart position into a position wherein said rack sections are together when said conveyor means and said first means are in a position other than said first operative position and for effecting a relative movement between a cooperating rack section and the rack section supported by said second means from a spaced apart position into a position wherein said rack sections are together when said conveyor means and said second means are disposed in a position other than said second operative position.

23. Apparatus as defined in claim 22 including means on said frame means disposed in spaced relation to said baling station for supporting a device capable of receiving and supporting a plurality of loaded racks, rail means mounted on said frame means in horizontally extending relation between said baling station and said device supporting means, and wherein said cooperating rack section relative movement effecting means includes means mounted on said rail means for movement therealong for receiving and supporting a cooperating rack section.

24. Apparatus as defined in claim 23 including cable hoist means carried by said frame means for effecting movement of successive loaded racks from supporting relation with said cooperating rack section receiving and supporting means into supporting relation to a device carried by said device supporting means.

25. Apparatus operable during the harvesting of tobacco leaves in a tobacco field for compressing successive batches of harvested tobacco leaves in bulk form with the flat surfaces thereof disposed generally in one direction and with a substantial portion of the flat surfaces of the leaves generally parallel into successive racks of the type including relatively movable sections which together provide means for peripherally confining a batch of leaves and spaced prong means extending within the peripheral confining means in piercing relation to the batch of leaves in a direction generally perpendicular to the parallel flat surfaces thereof so as to provide interior support for the leaves while permitting flow of air between the leaves within the confining means in the direction of disposition of the flat surfaces thereof, said apparatus comprising a horizontally extending platform-like frame, a plurality of ground engaging wheels, means supporting said frame on said wheels for movement through a tobacco field with said frame at a height sufficient to permit mature tobacco stalks to pass thereunder, a leaf defoliating station disposed below said frame at which tobacco leaves are removed from the tobacco plants during the movement of said frame through the field, a baling station on said frame, conveyor means carried by said frame for receiving the removed leaves at said defoliating station and conveying the same upwardly to said baling station, means on said frame at said baling station for receiving and supporting successive batches of leaves in bulk form with the flat surfaces thereof disposed generally in one direction and with a substantial portion of the flat surfaces of the leaves generally parallel, and means on said frame at said baling station for effecting a relative movement of successive rack sections in spaced apart relation with a batch of leaves disposed therebetween together to pierce the prong means thereof through said leaves in a direction perpendicular to the general parallel leaves thereof and to compress the batch of leaves into supporting relation to the rack.

26. Apparatus operable during the harvesting of tobacco leaves in a tobacco field for compressing successive batches of harvested tobacco leaves in bulk form with the flat surfaces thereof disposed generally in one direction and with a substantial portion of the flat surfaces of the leaves generally parallel into successive racks of the type including relatively movable sections which together provide means for peripherally confining a batch of leaves and spaced prong means extending within the peripheral confining means in piercing relation to the batch of leaves in a direction generally perpendicular to the parallel flat surfaces thereof so as to provide interior support for the leaves while permititng flow of air between the leaves within the confining means in the direction of disposition of the flat surfaces thereof, said apparatus comprising a horizontally extending platform-like frame, a plurality of ground engaging wheels, means supporting said frame on said wheels for movement through a tobacco field with said frame at a height sufficient to permit mature tobacco stalks to pass thereunder, a leaf defoliating station disposed below said frame at which tobacco leaves are removed from the tobacco plants during the movement of said frame through the field, a baling station on said frame, conveyor means carried by said frame for receiving the removed leaves at said defoliating station and conveying the same upwardly to said baling station, a turntable mounted on said frame at said baling station for movement about a vertical axis, said turntable having a plurality of leaf receiving and supprting means thereon movable with said turntable between leaf loading and rack securing positions, each of said leaf receiving and supporting means when disposed in said leaf loading position being operable to receive a batch of tobacco leaves and support the same in bulk form with their flat surfaces disposed generally in one direction and a substantial portion of their flat surfaces generally parallel, and means on said frame means at said baling station for effecting a relative movement of successive rack sections in spaced apart relation with a batch of leaves disposed therebetween together to pierce the prong means thereof through said leaves in a direction generally perpendicular to the generally parallel leaves thereof and to compress the batch of leaves into supporting relation to the rack.

27. Apparatus operable during the harvesting of tobacco leaves in a tobacco field for compressing successive batches of harvested tobacco leaves in bulk form with the flat surfaces thereof disposed generally in one direction and with a substantial portion of the flat surfaces of the leaves generally parallel into successive racks of the type including relatively movable sections which together provide means for peripherally confining a batch of leaves and spaced prong means extending within the peripheral confining means in piercing relation to the batch of leaves in a direction generally perpendicular to the parallel flat surfaces thereof so as to provide interior support for the leaves while permitting flow of air between the leaves within the confining means in the direction of disposition of the flat surfaces thereof, said apparatus comprising a horizontally extending platform-like frame, a plurality of ground engaging wheels, means supporting said frame on said wheels for movement through a tobacco field with said frame at a height sufficient to permit mature tobacco stalks to pass thereunder, a leaf defoliating station disposed below said frame at which tobacco leaves are removed from the tobacco plants during the movement of said frame through the field, a baling station on said frame, conveyor means carried by said frame for receiving the removed leaves at said defoliating station and conveying the same upwardly to said baling station, means on said frame at said baling station for receiving and supporting successive batches of leaves in bulk form with the flat surfaces thereof disposed generally in one direction and with a substantial portion of the flat surfaces of the leaves generally parallel, means on said frame at said baling station for effecting a relative movement of successive rack sections in spaced apart relation with a batch of leaves disposed therebetween together to pierce the prong means thereof through said leaves in a direction perpendicular to the general parallel leaves thereof and to compress the batch of leaves into supporting relation to the rack, means carried by said frame for movement between a first position adjacent the ground and a second position adjacent said frame for raising and lowering a device capable of receiving and supporting a plurality of loaded racks mounted thereon between said first and second positions, and rack moving means for supporting successive loaded racks for movement into supporting relation with a device mounted on said raising and lowering means when the latter is disposed in said second position.

28. Apparatus for removing the ripe leaves from tobacco stalks in a field and compressing successive batches of the removed tobacco leaves in bulk form with the flat surfaces thereof disposed generally in one direction with a substantial portion of the flat surfaces of the leaves generally parallel into successive racks of the type including relatively movable sections which together provide means for peripherally confining a batch of leaves and spaced prong means extending within the peripheral confining means in piercing relation to the batch of leaves in a direction generally perpendicular to the parallel flat surfaces thereof so as to provide interior support for the leaves while permitting flow of air between the leaves within the confining means in the direction of disposition of the flat surfaces thereof, said apparatus comprising frame means, ground engaging wheels supporting said frame means for movement through a tobacco field, a driven defoliating mechanism carried by said frame means for effecting removal of the leaves from the stalks during the movement of said frame means through the field, a baling station on said frame means spaced from said defoliating mechanism, conveyor means on said frame means for receiving the leaves removed by said defoliating mechanism and conveying the same to said baling station, means on said frame means at said baling station for receiving and supporting successive batches of leaves in bulk form with the flat surfaces thereof disposed generally in one direction and with a substantial portion of the flat surfaces of the leaves generally parallel, and means on said frame means at said baling station for effecting a relative movement of successive rack sections in spaced apart relation with a batch of leaves disposed therebetween together to pierce the prong means thereof through said leaves in a direction generally perpendicular to the generally parallel leaves thereof and to compress the batch of leaves into supporting relation to the rack.

29. Apparatus as defined in claim 28 including power means carried by said platform-like frame, means drivingly connecting said power means to at least one of said ground engaging wheels for propelling said platform-like frame.

30. Apparatus for removing the ripe leaves from tobacco stalks in a field and compressing successive batches of the removed tobacco leaves in bulk form with the flat surfaces thereof disposed generally in one direction with a substantial portion of the flat surfaces of the leaves generally parallel into successive racks of the type including relatively movable sections which together provide means for peripherally confining a batch of leaves and spaced prong means extending within the peripheral confining means in piercing relation to the batch of leaves in a direction generally perpendicular to the parallel flat surfaces thereof so as to provide interior support for the leaves while permitting flow of air between the leaves within the confining means in the direction of disposition of the flat surfaces thereof, said apparatus comprising a horizontally extending platform-like frame, a plurality of ground engaging wheels, means supporting said frame on said wheels for movement through a tobacco field with said frame at a height sufficient to permit nature tobacco stalks to pass thereunder, a movable frame mounted in said platform-like frame for vertical movement with respect thereto, a driven defoliating mechanism carried by the lower portion of said movable frame for effecting removal of the leaves from the tobacco stalks during the movement of said platform-like frame through the field, means acting between said frames for effecting vertical movement of said movable frame so as to determine the vertical position on the stalks where the leaves are removed by said defoliating mechanism, conveyor means mounted on said movable frame for receiving the leaves removed by said defoliating mechanism and conveying the same upwardly to a position above said platform-like frame, a baling station on said platform-like frame, means for directing the leaves issuing from said conveyor means to said baling station, means on said platform-like frame at said baling station for receiving and supporting successive batches of leaves in bulk form with the flat surfaces thereof disposed generally in one direction and with a substantial portion of the flat surfaces of the leaves generally parallel, and means on said platform-like frame at said baling station for effecting a relative movement of successive rack sections in spaced apart relation with a batch of leaves disposed therebetween together to pierce the prong means thereof through said leaves in a direction generally perpendicular to the generally parallel leaves thereof and to compress the batch of leaves into supporting relation to the rack.

31. Apparatus as defined in claim 30 wherein said means for receiving and supporting successive batches of leaves comprises a turntable mounted on and above said platform-like frame for movement about a vertical axis, and a pair of bin-like structures carried by said turntable for movement between a leaf receiving and supporting position and a rack securing position.

32. Apparatus for removing the ripe leaves from tobacco stalks in a field and compressing successive batches of the removed tobacco leaves in bulk form with the flat surfaces thereof disposed generally in one direction with a substantial portion of the flat surfaces of the leaves generally parallel into successive racks of the type including relatively movable sections which together provide means for peripherally confining a batch of leaves and spaced prong means extending within the peripheral confining means in piercing relation to the batch of leaves in a direction generally perpendicular to the parallel flat surfaces thereof so as to provide interior support for the leaves while permitting flow of air between the leaves within the confining means in the direction of disposition of the flat surfaces thereof, said apparatus comprising a horizontally extending platform-like frame, a plurality of ground engaging wheels, means supporting said frame on said wheels for movement through a tobacco field with said frame at a height sufficient to permit tobacco stalks to pass thereunder, a movable frame mounted in said platform-like frame for vertical movement with respect thereto, a driven defoliating mechanism carried by the lower portion of said movable frame for effecting removal of the leaves from the tobacco stalks during the movement of said platform-like frame through the field, means acting between said frame for effecting vertical movement of said movable frame so as to determine the vertical position on the stalks where the leaves are removed by said defoliating mechanism, conveyor means mounted on said movable frame for receiving the leaves removed by said defoliating mechanism and conveying the same upwardly to a position above said platform-like frame, a baling station on said platform-like frame, means for directing the leaves issuing from said conveyor means to said baling station, means on said platform-like frame at said baling station for receiving and supporting successive batches of leaves in bulk form with the flat surfaces thereof disposed generally in one direction and with a substantial portion of the flat surfaces of the leaves generally parallel, means on said platform-like frame at said baling station for effecting a relative movement of successive rack sections in spaced apart relation with a batch of leaves disposed therebetween together to pierce the prong means thereof through said leaves in a direction generally perpendicular to the generally parallel leaves thereof and to compress the batch of leaves into supporting relation to the rack, means carried by said platform-like frame for movement between a first position adjacent the ground and a second position adjacent said platform-like frame for raising and lowering a device capable of receiving and supporting a plurality of loaded racks mounted thereon between said first and second positions, and rack moving means for supporting successive loaded racks for movement into supporting relation with a device mounted on said raising and lowering means when the latter is disposed in said second position.

33. Apparatus as defined in claim 32 including a device arranged to be supported on said raising and lowering means, said device comprising a pair of upright imperforate walls, an imperforate roof extending between the upper portion of said walls, and rail means on said walls extending in horizontal relation substantially throughout the longitudinal extent of said walls for slidably receiving and supporting a plurality of said loaded racks, the ends of said device being open, said wall and roof having means on each of the ends thereof for substantially sealingly abutting the opposite end of a similar device.

References Cited in the file of this patent

UNITED STATES PATENTS

| | | |
|---|---|---|
| 425,696 | Power et al. | Apr. 15, 1890 |
| 497,687 | Rogers | May 16, 1893 |
| 1,522,489 | Bolen et al. | Jan. 13, 1925 |
| 2,475,568 | Moore | July 5, 1949 |
| 2,696,069 | Hawkins | Dec. 7, 1954 |
| 2,709,103 | Tillman | May 24, 1955 |
| 2,742,163 | Michauz | Apr. 17, 1956 |
| 2,763,117 | Wagnon | Sept. 18, 1956 |
| 2,798,496 | Jones | July 9, 1957 |
| 2,816,411 | Wilson | Dec. 17, 1957 |
| 2,952,370 | Long | Sept. 13, 1960 |